United States Patent [19]

McCreight et al.

[11] 4,148,098
[45] Apr. 3, 1979

[54] DATA TRANSFER SYSTEM WITH DISK COMMAND VERIFICATION APPARATUS

[75] Inventors: Edward M. McCreight, Los Altos; Charles P. Thacker, Palo Alto, both of Calif.

[73] Assignee: Xerox Corporation, Stamford, Conn.

[21] Appl. No.: 806,781

[22] Filed: Jun. 15, 1977

Related U.S. Application Data

[63] Continuation-in-part of Ser. No. 733,640, Oct. 18, 1976, abandoned, which is a continuation of Ser. No. 518,555, Oct. 29, 1974, abandoned.

[51] Int. Cl.² .................. G06F 11/00; G06F 13/00
[52] U.S. Cl. .................................................. 364/200
[58] Field of Search ... 364/200 MS File, 900 MS File; 235/301, 302.3, 304

[56] References Cited

U.S. PATENT DOCUMENTS

| | | | |
|---|---|---|---|
| 3,704,363 | 11/1972 | Salmassy et al. | 364/200 |
| 3,737,861 | 6/1973 | O'Neill et al. | 364/200 |
| 3,900,834 | 8/1975 | Casey et al. | 364/200 |
| 3,905,023 | 9/1975 | Perpiglia | 364/200 |
| 3,972,023 | 7/1976 | Bodner et al. | 364/200 |

Primary Examiner—Mark E. Nusbaum
Attorney, Agent, or Firm—Barry Paul Smith

[57] ABSTRACT

A data processing system includes a disk drive, a disk drive controller, a main memory and a CPU. The main memory has disk command data stored therein in a chain of disk command blocks (DCB's). Each DCB contains a first word pointing to the next DCB in the chain, a second word containing status information and a third word containing command information. A portion of the command word contains a predetermined verification word when the DCB is valid. The CPU includes means for comparing this portion with the predetermined verification word as stored in a constant memory. If the two correspond, the DCB is valid. Each DCB also inclues a fourth word pointing to a block of main memory in which header data is stored. Header data defines the address of the recording location of the disk. A fifth word points to a block of main memory in which label data is stored. Label data defines the name and/or number of the file, as well as itself including a pointer to the address location on the disk at which the next page of the file data is stored. A sixth word of the DCB points to a block of main memory in which the associated page of file data is stored. A seventh word specifies the recording location on the disk (drive, track, sector) where the actions specified in the command word are to be carried out. Each such recording location is capable of having stored therein the header, label and file data associated with a specific DCB.

10 Claims, 17 Drawing Figures

4,148,098

DATA TRANSFER SYSTEM WITH DISK COMMAND VERIFICATION APPARATUS

CROSS REFERENCE TO RELATED APPLICATIONS

This application is a continuation-in-part of U.S. application Ser. No. 733,640, now abandoned, filed on Oct. 18, 1976 as a continuation of U.S. application Ser. No. 518,555, now abandoned, filed on Oct. 29, 1974 in the names of Edward M. McCreight and Charles P. Thacker for MICROPROGRAMMABLE DISK OPERATING SYSTEM.

BACKGROUND OF THE INVENTION

This invention relates to data processing systems and, more particularly, to a data processing system including a peripheral storage device, such as a disk drive, having at least one recording medium, such as a recording disk, and means for writing data onto and reading data from the recording disk.

Such systems are, of course, well known in the art and traditionally further include a disk drive controller coupled to the disk drive and responsive to predetermined instructions and command data for controlling the writing of data onto and reading of data from the recording disk, as well as a main memory coupled to the controller for storing data to be written onto to read from the disk and the command data. Lastly, a CPU is included for supplying the predetermined instructions to the controller and for addressing the main memory.

As is conventional in prior art systems, each recording surface of a disk is divided into a plurality of tracks and a plurality of sectors. Each sector of track normally contains both header data (data containing the disk address of that track-sector) and file data (data corresponding to a page of a particular file of data). In the past, a file directory has been employed to list the first page of every file recorded on the disk surface, since the various pages of a flie need not be recorded at consecutive sectors, and usually are not. However, the file directory is itself a file recorded on the disk surface.

The obvious disadvantage of the above arrangement is that if the file directory were damaged or destroyed due to a head crash or the like, it is virtually impossible to use the disk thereafter. The disk might just as well be discarded and the data contained thereon lost.

Another problem with prior art systems is that sometimes invalid disk command data is accessed from main memory, such as through an improper or erroneous addressing or the like. Invalid disk command data might result in the disk drive controller improperly or incorrectly controlling the disk drive.

It would be desirable, therefore, to provide a data processing system which is capable of sustained operation notwithstanding the damage or destruction of a file directory recorded on the disk or other recording medium. It would further be desirable to be able to reconstruct a damaged or destroyed file directory from the remaining data recorded on the disk. It would also be desirable to be able to verify the validity of command data accessed from the main memory prior to use thereof by the controller in the event that it may be invalid.

SUMMARY OF THE INVENTION

In accordance with one aspect of the present invention, a data processing system is provided comprising a peripheral storage device having at least one recording medium and means for writing data onto and reading data from said recording medium; a controller coupled to said peripheral storage device and responsive to predetermined instructions and command data for controlling the writing of data onto and reading of data from said recording medium; a main memory storage device coupled to said controller and having a plurality of addressable storage locations, at least some of said storage locations capable of storing data to be written onto or that has been read from said recording medium, and at least some other of said storage locations capable of storing said command data, said command data when valid including a portion thereof defining a predetermined verification word; and a central processing unit coupled to said controller and to said main memory storage device and including means for supplying said predetermined instructions to said controller, means for addressing the storage locations of said main memory storage device, and means for examining said portion of said command data to verify the validity of said command data.

In accordance with the preferred embodiment, the means for examining includes constant memory means having said predetermined verification word stored therein, and means for comparing said portion of said command data with said predetermined verification word stored in said constant memory means in order to verify the validity of said command data.

In accordance with another aspect of the present invention, a data processing system is provided comprising a peripheral storage device having at least one recording medium and means for writing data onto and reading data from said recording medium; a controller coupled to said peripheral storage device and responsive to predetermined instructions and command data for controlling the writing of data onto and reading of data from said recording medium; a main memory storage device coupled to said controller and having a plurality of addressable storage locations, at least some of said storage locations capable of storing data to be written onto or that has been read from said recording medium, and at least some other of said storage locations capable of storing said command data as a chain of command data blocks, each command data block containing a first word pointing to the next command data block in the chain, a second word pointing to a block of said main memory storage device capable of storing label data defining the name and/or number of a file of data to be written onto or read from said recording medium, and a third word pointing to a block of said main memory storage device capable of storing a page of said file data; and a central processing unit coupled to said controller and to said main memory storage device and including means for supplying said predetermined instructions to said controller, and means for addressing the storage locations of said main memory storage device.

In accordance with the preferred embodiment, the peripheral storage device includes a disk drive, and each distinct recording location on the disk is divided into three blocks, each of which can be read, verified against predetermined data stored in the main memory, or written, independent of the others. The first block is called the header block, and is generally used to verify that the disk positioning mechanisms are functioning correctly. The second block is called the label block, and as alluded to above, holds data describing the name and structure of the file, a portion of whose data is recorded in the third block, called the data block. Each block of label data preferably contains a pointer to the recording location on the disk of the next page of the file. Accordingly, it is possible not only to be able to continue to use the disk if primarily just the file directory is damaged or destroyed, but also to reconstruct the file directory by reading the label data in each sector of each track.

These and other aspects and advantages of the present invention will be more completely described below with reference to the accompanying drawings.

DESCRIPTION OF THE PREFERRED EMBODIMENT

Figure 1:
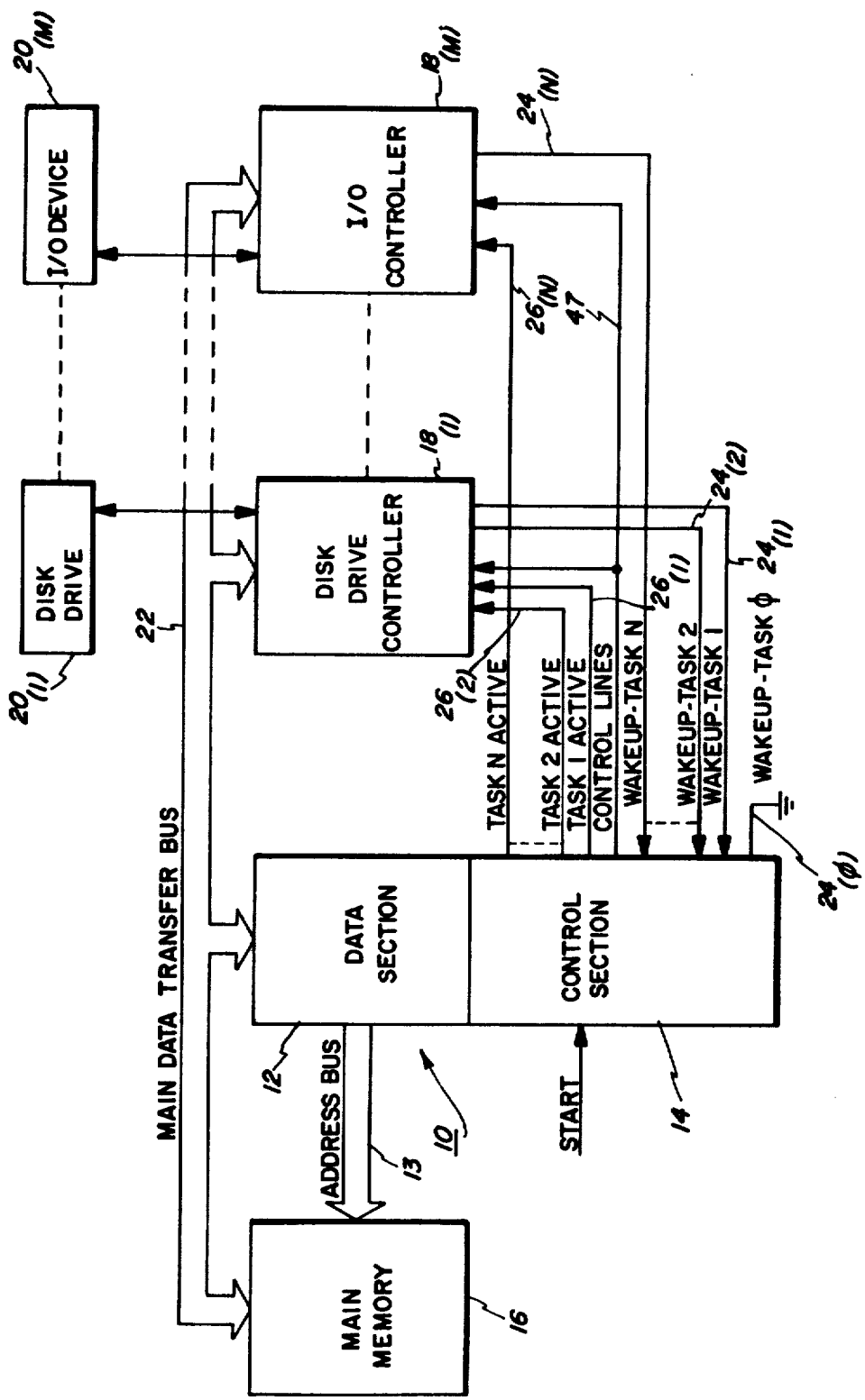
FIG. 1 is a block diagram representation of an exemplary data processing system of the present invention.

Referring to FIG. 1, a data processing system of the present invention is shown. The system includes a central processing unit (CPU) 10 that is comprised of a data section 12 and a control section 14. The system also includes a main memory 16 to be described below and a plurality of input-output (I/O) controllers 18, e.g., "M" I/O controllers designated $18_{(1)}$ through $18_{(M)}$. Each of the I/O controllers 18 is connected to a respective one or more of a plurality of I/O devices 20 for controlling same. At least one of the I/O controllers 18, e.g. controller $18_{(1)}$, is a disk drive controller for controlling one or more disk drives $20_{(1)}$. Examples of other typical I/O devices that may be employed as I/O devices 20 in the system of FIG. 1 are display devices, keyboards and cursor control devices (sometimes each referred to as a "mouse"). The depiction of only one disk drive controller $18_{(1)}$ and one associated disk drive $20_{(1)}$ is, of course, only exemplary.

Information is transferred to and from the data section 12 of the CPU 10 by means of a main data transfer bus 22. The information is desirably transferred in bit-parallel format. Typical CPU's are designed to operate in 8-bit or 16-bit format, i.e., 8-bit or 16-bit quantities are transferred to and from the data section 12 along the bus 22, which would then be comprised of either at least eight or at least sixteen parallel lines. Information may be transferred on the data bus 22 between the main memory 16 and the data section 12, between the I/O controllers 18 and the data section 12, as well as between each of the I/O controllers 18 and the main memory 16.

Each of the I/O controllers 18, including the disk drive controller $18_{(1)}$, is capable of generating one or more task request signals in the form of "wake-up" commands whenever the particular controller 18 requires one or more services to be performed by the CPU 10. The specific nature of two wakeup-task request signals that are preferably generated by the disk drive controller $18_{(1)}$ will be described in more detail below. The wakeup-task request signals from the controllers 18 are applied on respective lines $24_{(1)}$–$24_{(N)}$. The two wakeup-task requests from the disk drive controller $18_{(1)}$, arbitrarily designated wakeup-tasks 1 and 2, are applied on lines $24_{(1)}$ and $24_{(2)}$ to the control section 14 of the CPU 10. In order for each controller 18 to be informed when the CPU 10 is executing instructions relating to the requested service, the control section 14 includes means to be described below for applying a "task-active" status signal back to the controller. These task-active status signals are applied on lines 26 from the control section 14 to the controllers 18, as shown in FIG. 1. There are two task-active lines associated with the disk drive controller $18_{(1)}$, i.e. task 1 active on line $26_{(1)}$ and task 2 active on line $26_{(2)}$.

Figure 2:
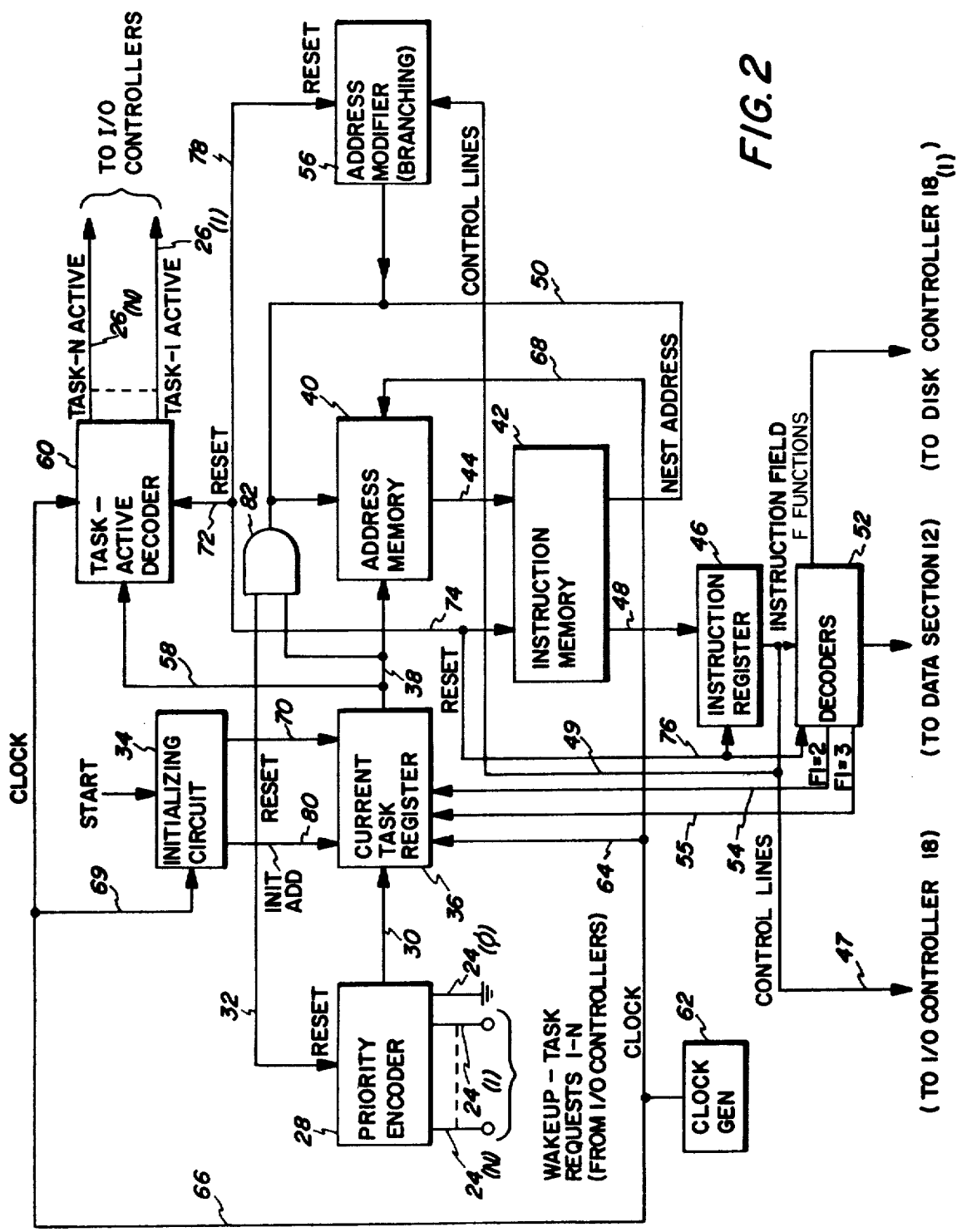
FIG. 2 is a schematic block diagram representation of the control section of the CPU depicted in FIG. 1.

Reference is now had to FIG. 2 where the control section 14 of the CPU 10 will be described. At the outset, it must be stated generally that the control section 14 applies instructions to the data section for execution thereby. Additionally instructions are applied to the various I/O controllers 18 for execution thereby. The instructions are forwarded in accordance with a particular sequence or routine to be carried out and identified with a particular task to be serviced. The control section 14 includes means to be described below for determining which of a plurality of wakeup-task request signals that may have been applied to the control section 14 has the highest current priority value. More specifically, each of the plurality of tasks to be serviced is preassigned a unique priority value. Thus, performing a requested service for the disk drive controller $18_{(1)}$ may be of higher priority than performing a requested service for I/O controller $18_{(M)}$. The control section 14 then forwards instructions associated with the highest current task to be serviced to the data section 12 and respective I/O controller 18 for execution.

Referring now in more detail to FIG. 2, the control section 14 includes a priority encoder 28 which has task request inputs connected to the N task request lines 24. As explained above, wakeup-task request signals for task 1-N are provided from the I/O controllers 18. Additionally, a wakeup-task request signal for task $\phi$, which requests servicing the main program, is always present, as will be explained in more detail below. The priority encoder 28 includes circuitry (not shown) for generating a multi-bit control signal on a respective plurality of lines 30 (only one shown) related to the highest priority wakeup-task request signal currently applied as an input to the encoder 28. The priority encoder 28 includes a further input for receiving a RESET signal on a line 32 from an initialize circuit 34 to be described in more detail below.

Now then, the control signal developed on lines 30 is applied to respective inputs of a current task register 36 which responds to such control signal for generating a multi-bit address signal that is applied in bit-parallel format on a respective plurality of lines 38 from the register 36 to respective inputs of an address memory 40. The address memory 40 includes a plurality of storage locations, preferably defined by a respective plurality of multi-bit registers (not shown). There are preferably N such registers included in the address memory 40, each one being addressed by a unique multi-bit code defined by the address signal applied thereto from the current-task register 36 on lines 38.

Each one of the N registers in the address memory 40 is associated with a respective one of the N tasks to be performed, as defined above. In actuality, each of the address memory registers is capable of storing the next address of an executable microinstruction stored in a microinstruction memory 42. In this respect, each of the N address memory registers may be thought of as a program counter for its respective task to be serviced relative to the corresponding microinstruction routine stored in the instruction memory 42.

Each instruction stored in the memory 42 is accessed in response to a corresponding address signal applied on address lines 44 from the address memory 40. Each instruction includes an instruction field preferably comprised of twenty-two bits, and a next-address field preferably comprised of ten bits. The specific constitution of the 22-bit instruction field will be described in more detail below in connection with FIG. 3. The instruction field is loaded into an instruction register 46 on lines 48 and is then applied through appropriate decoders 52 (also to be described in more detail below in connection with FIG. 3) to the data section 12 of the CPU. Certain of these decoded instructions are also forwarded to the disk drive controller 18(1), as will be discussed below in connection with FIG. 3 and other Figures. The next-address field is fed back on lines 50 to the currently addressed register in the address memory 40. In this manner, each of the N registers in the memory 40 will always contain the address of the next microinstruction stored in the instruction memory 42 to be executed in accordance with the particular task to be serviced.

A portion of the twenty-two bit instruction field of each microinstruction may be dedicated to various special functions, some of which are applied on control lines 47 to respective ones of the I/O controllers 18 for controlling same, and some of which are applied on control lines 49 to address modifier circuits 56 (to be described below) for branching. In accordance with the preferred embodiment, there is a four-bit special function "sub-field" in the instruction field of each microinstruction (hereinafter referred to as the "F1" sub-field), wherein two of the sixteen four-bit codes capable of being defined (e.g. F1=2, F1=3) are respectively representative of "TASK" and "BLOCK" functions. A TASK signal component of an accessed instruction, upon being decoded by an appropriate one of the decoders 52, is applied on a line 54 to the current task register register 36 for enabling same to load an address signal, representing the current highest priority task requesting service. This address signal is then applied to the address memory 40. A decoded BLOCK signal is applied on a line 55 to the current task register 36 for disabling same.

It will be appreciated that a TASK signal can be presented in any desired microinstruction during any routine to be executed. Normally, a TASK signal would be generated at least once during each microinstruction routine in order to enable any higher priority task awaiting service to interrupt the current routine in order to be serviced by the CPU 10. If a particular task to be serviced has a microinstruction routine that carries out a plurality of different functions that can be independently serviced, then a TASK signal would normally be written into the last microinstruction of each segment of the routine identified with a particular one of such functions.

Continuing with a description of FIG. 2, the control section 14 of the CPU 10 further includes conventional address modifier circuits 56 which, in a known manner, are responsive to instructions on control lines 49 for modifying the next-address signal being fed back on lines 50 from the instruction memory 42 to the address memory 40. As is conventional, such address modifiers are used for branching. Specific details of the address modifier 56 may be had by reference to copending U.S. application Ser. No. 769,254 filed on Feb. 16, 1977 as a continuation of now abandoned U.S. application Ser. No. 518,679 filed on Oct. 29, 1974 by Charles P. Thacker and assigned to the assignee of the present invention, both such applications being hereby incorporated by reference.

The multi-bit address signal developed at the output of the current task register 36, in addition to being applied to the address memory 40 on lines 38, is also applied on lines 58 to a task-active decoder 60. The decoder 60 responds to the address signal output of the register 36 and generates one of the N TASK-ACTIVE signals alluded to earlier on its respective line 26, dependent upon the current highest priority task to be serviced. The decoder 60 includes a delay circuit for delaying the application of a TASK-ACTIVE signal to the respective I/O controller 18 by one clock cycle of the processor. In this manner, the appropriate TASK-ACTIVE signal will be generated at a time corresponding to the execution of instructions related to the task being serviced.

The control section 14 as shown in FIG. 2 also includes a clock generator 62 for generating appropriate CLOCK signals for application to the current-task register 36 on a line 64, the task-active decoder 60 on a line 66, the address memory 40 on a line 68, and the initialization circuit 34 on a line 69.

Still referring to FIG. 2, the initialization circuit 34 is responsive to a START signal generated when the system is reset by the operator. Upon receipt of the START signal, conventional circuitry in the circuit 34 causes a RESET signal to be generated which is applied to the priority encoder 28 on line 32, to the current task register 36 on a line 70, to the task-active decoder 60 on a line 72, to the instruction memory 42 on a line 74, to the instruction register 46 and decoders 52 on a line 76, and to the address modifier 56 on a line 78. Upon receipt of a RESET signal, these various components of the control section 14 are reset.

The initialization circuit 14, in response to a START signal, also generates a multi-bit initialization address signal on a respective plurality of lines 80. In a preferred embodiment of the invention, "N" equals sixteen and thus the initialization address signal is a four-bit signal that is initially zero, i.e., 0000, and is incremented by one at the rate of the CLOCK signal pulses applied on line 69. The RESET signal is maintained for sixteen cycles, i.e. sixteen CLOCK signal pulses, at which time the initialization address on lines 80 will increment from zero (0000) to fifteen (1111). As will be described below, the address signal output of the current task register 36 during initialization is identical to the initialization address signal. During initialization, the address signal output of the current task register 36 is applied through an AND-gate 82, which is enabled by a RESET signal from the initialization circuit 34, to the address memory 40. In this manner, the address signal (0000) will be loaded into register number zero in the address memory 40, the address signal one (0000) into register number one, and so on. This process initializes the address memory by setting the various registers therein at their respective starting values.

Further details of the control section 14 of the CPU 10 may be had through a review of the aforementioned copending U.S. applications Ser. Nos. 769,254 and 518,679.

Figure 4:
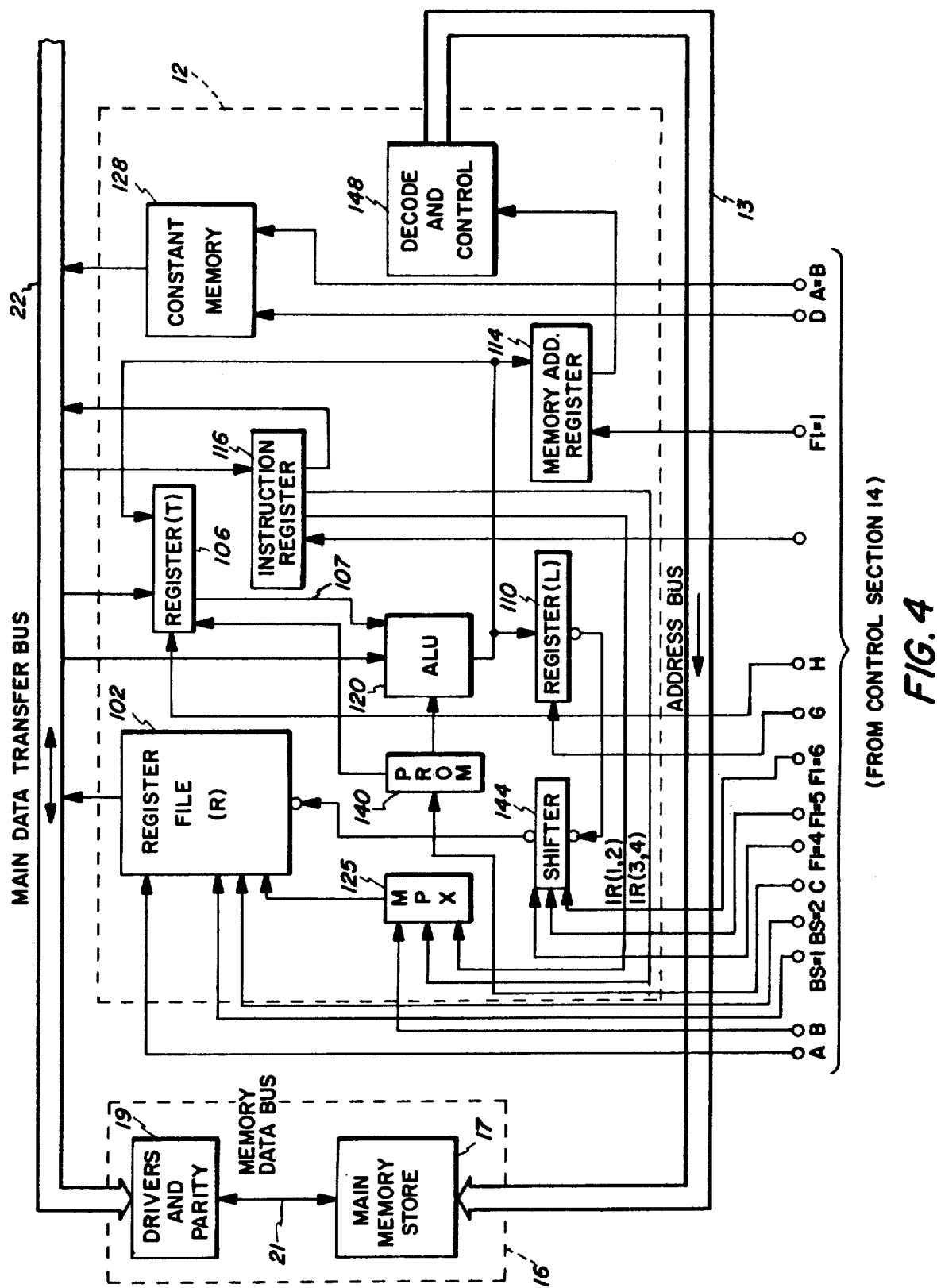
FIG. 4 is a schematic block diagram representation of the data section of the CPU and the main memory depicted in FIG. 1.

Referring now to FIG. 4, the basic elements of the data section 12 of the CPU 10 are a register file 102, T register 106, L register 110, memory address register (MAR) 114, and instruction register 116. The registers 106, 110, 114 and 116 are connected to the register file 102 and to an arithmetic and logic unit (ALU) 120 by means of the main data transfer bus 22, which is desirably 16 bits in width.

Data is typically put onto the bus 22 from the register file 102 which is preferably implemented by a group of 32 registers whose contents are read or loaded as selected by a specific microinstruction field. Data may also be entered on the bus 22 from a constant memory 128 which is preferably implemented by any commercially available 256-word read only memory (ROM) which holds arbitrary 16-bit constants. Data may be available as well from the I/O devices 20, such as the disk drive 20(1). Other data is available from the main memory 16 and portions of instructions are entered on the bus 22 from the instruction register 116. The main memory 16 will be described in more detail below.

Data may be transferred from the bus 22 to the I/O controllers 18, the main memory 16, the instruction register 116, the T register 106, or even the L register 110 through the ALU 120. Data transfers are under the control of microinstructions which are executed from the instruction memory 42, which is desirably implemented by a conventional 1024 word × 32-bit programmable read-only-memory (PROM).

Figure 3:
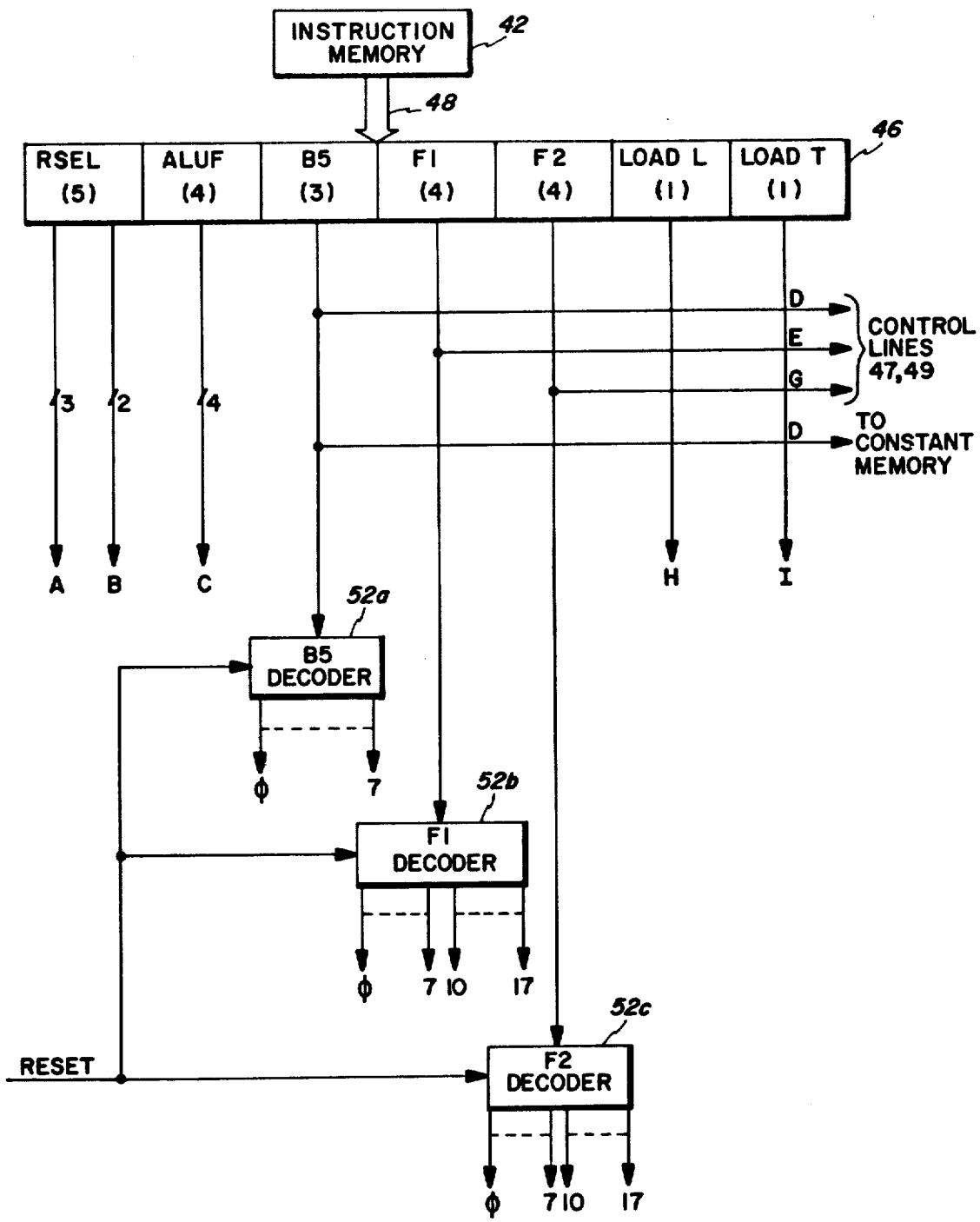
FIG. 3 is a more detailed block diagram representation of the instruction register and decoders depicted in FIG. 2.

The specific nature of the 22-bit instruction field of a 32-bit microinstruction accessed from the instruction memory 42 will now be described with reference to FIG. 3. As shown, the 22-bit instruction field loaded into the instruction register 46 includes seven "subfields" as follows:

| BIT(S) | SIGNAL | MEANING |
| --- | --- | --- |
| 0-2 | A | REGISTER (R) SELECT |
| 3,4 | B | REGISTER (R) SELECT |
| 5-8 | C | ALU FUNCTION |
| 9-11 | D | BUS DATA SOURCE |

-continued

| BIT(S) | SIGNAL | MEANING |
| --- | --- | --- |
| 12-15 | E | FUNCTION 1 |
| 16-19 | G | FUNCTION 2 |
| 20 | H | LOAD L |
| 21 | I | LOAD T |

The R Select field (bits 0-4, signals A and B) specifies one of the 32 registers which comprise the register file 102 to be loaded or read under control of the bus source field, or, in conjunction with the bus source field (bits 9-11, signal D), one of the 256 locations to be read from the constant memory 128. The low order two bits of the R address (but not the constant memory address) may be taken from fields in the instruction register 116, i.e. IR(1,2) and/or IR (3,4), as applied through a conventional multiplexer 125 (FIG. 4). This enables the main microprogram, i.e. task $\phi$, to address certain registers in the R file 102 more easily.

The ALU Function field controls the ALU 120. The ALU 120 can do a total of 48 arithmetic and logical operations. The 4-bit field is mapped by a PROM 140 into the 16 most useful functions. These functions are disclosed and described in more detail in the aforementioned parent applications Ser. Nos. 518,555 and 733,640, both of which are hereby incorporated by reference. One of these functions is to "Exclusive OR" a first signal supplied to the ALU from the main memory 16 on bus 22 with a second signal supplied to the ALU from the T register on lines 107 (FIG. 4). This function has significance in verifying the validity of disk command data accessed from the main memory 16, as will be explained in more detail below.

The bus data source field (bits 9-11, signal D), upon being decoded by BS decoder 52a, specifies one of 8 data sources for the bus 22 follows:

| OUTPUT BS DECODER 52a | SOURCE OF DATA |
| --- | --- |
| 0 | Read R Register 102 |
| 1 | Load R Register 102 |
| 2 | Nothing (−1) |
| 3 | Kstat (16 bits of disk status) |
| 4 | Kdata (16 bits of disk data) |
| 5 | Memory data (from main memory 16) |
| 6 | Input device data (4 bits, remainder of word is 1) : MOUSE (if used as one of I/O devices 20) |
| 7 | Disp (low order 8 bits of instruction register 116, sign extended) |

Output 1, i.e. Load R, is not logically a source, but since the register file (R) 102 is gated to the bus 22 during both reading and writing, it is included in the source specifiers.

The two function fields F1 and F2 specify the address modifiers, register load signals (other than those for the registers 102, 106 and 110) and other special conditions required. The first eight conditions specified by each field after being decoded by F decoders 52b and 52c are interpretated identically by all tasks, but the interpretation of the second eight decoded conditions depends on the active task. The first eight task-independent functions are given below, whereas the latter eight task-dependent (also referred to as "task-specific") functions will be described later.

| OUTPUT F1 DECODER 52b | NAME | MEANING |
|---|---|---|
| 0 | — | : No activity |
| 1 | MAR ← | : Load MAR 114 from ALU 120 output; start main memory 16 reference |
| 2 | TASK | : Switch tasks if higher priority wakeup pending |
| 3 | BLOCK | : Disable current task wakeup until reenabled by hardware generated condition |
| 4 | ←L lsh 1 | : Left shift L (one place) |
| 5 | ←L rsh 1 | : Right shift L (one place) |
| 6 | ←L lcy 8 | : Cycle L (8 places) |
| 7 | ←CONSTANT | : BUS constant ROM location addressed by R SELECT BUS SOURCE |

Outputs 4–6 are modified by functions fields F2=11 and F2=12, such fields to be described in detail later.

| OUTPUT F2 DECODER 52C | NAME | MEANING |
|---|---|---|
| 0 | — | No Activity |
| 1 | BUS=0 | NEXT ← NEXT OR (BUS=0) |
| 2 | SH 0 | NEXT ← NEXT OR (SHIFTER OUTPUT 0) |
| 3 | SH=0 | NEXT ← NEXT OR (SHIFTER OUTPUT =0) |
| 4 | BUS | NEXT ← NEXT OR BUS (06) -BUS (15) |
| 5 | ALUCY | NEXT ← NEXT OR LALUC0 (THE CARRY USED IS THAT PRODUCED BY THE ALU FUNCTION WHICH LAST LOADED THE L REGISTER 110 |
| 6 | STORE |  |
| 7 | CONSTANT | SAME AS F1=7 |

The ALU 120 is restricted by the mapping of its 4-bit field by the PROM 140 so that only sixteen arithemetic and logical functions may be performed. The output of the ALU 120 is transferred to the L and memory address registers 110 and 114. The T register 106 may also be loaded from the output of the ALU 120 under certain conditions. The L register 110 is connected to a shifter 144 which is capable of left and right shifts by one place, and cycles of eight. Double-length shifts may also be formed. The output of the shifter 144 is transferable to the register file 102. The output of the MAR register 114 is decoded by a decode and control unit 148 and transferred along the address bus 13 to the main memory 16, and more particularly to a main memory store 17 of the main memory 16. Details of the main memory 16 and its main memory store 17 will be described below.

As indicated above, microinstructions are executed one at a time in each processing cycle. Generally speaking, with respect to the data section 12 of the CPU 10, a microinstruction consists of taking a piece of data from a source register in the register file 102, operating upon it, and loading the results into another register. For example, a microinstruction may dictate that the contents of the 23rd register in the register file 102 be transferred by way of the bus 22 to the T register 106. This microinstruction would be in the form of having the R select equalling 23 and having the load T bit set. An addition operation may take as many as three microinstructions. If it is desired to add the contents of the 22nd register of the register file 102 with the 23rd register and transfer the results to the 30th register, three microinstructions are, in fact, necessary. The first microinstruction would read the contents of the 22nd register into the T register 106; the second microinstruction would read the contents of the 23rd register through the ALU 120 and into the L register 110 and simultaneously would define an addition operation in the ALU function field so that the ALU 120 would perform addition (the result stored in the L register 110 at the end of the second microinstruction would thus be the sum of the contents of the 22nd register and the contents of the 23rd register); the third microinstruction would transfer the contents of the L register 110 through the shifter 144 back into the appropriate destination in the register file 102.

The microinstruction is structured so that a parallelism of different operations may be directed by a given instruction. This segmentation is achieved by the definition of specific fields within the instruction as is represented in in FIG. 3. A given instruction is selected from the instruction memory 42 and is transferred to the microinstruction register 46 where it is stored as shown in FIG. 2. In the preferred embodiment of the invention and as indicated above, seven fields comprising an instruction width of 22 bits dictate the processing operations to be performed. Five bits (signals A and B) are used to select the location in the register file 102 which are to be involved during a given instruction period. If the register file 2 is not to be involved within a particular processing cycle, this RSELECT (RSEL) field has a value of zero. A 4-bit arithmetic and logic unit function field ALUF (signal C) specifies one of 16 logical operations, including addition and subtraction, which the ALU 120 can perform. A 3-bit bus source field BS (signal D) determines which of the previously identified eight possible data sources are gated onto the 16-bit bus 22 during the particular microinstruction period.

The Read R and Load R bus sources are typically used in almost every microinstruction. With the value of two, the BS field specifies that nothing is to be placed on the bus 22. The Kstat source causes status information stored within the disk drive controller 18(1) to be placed on the bus 22. Kdata causes 16 bits of disk data stored within the disk drive controller to be placed on the bus. Memory data identifies data which would result from a fetch from a particular location in the main memory store 17. The indicator device data could possibly be represented by four external control bits. Disp would be the lower 8-bits of the instruction register 116, with bits 0–7 made equal to bit 8 (sign extension). This particular bus source specification allows for the definition of microcode which provides fast processing. As has been already mentioned, the register file 102 is gated to the bus 22 during both the reading and the writing of the file 102. Thus, Load R source is included in the source specifiers.

Whenever the register file 102 is selected for reading or writing, data is necessarily placed on the bus 22. Therefore, the bus 22 contains data whenever a write operation is performed on the files 102, even though some other transfer in parallel may be made. Writing into the file 102, then, uses the Load R condition in the BS field. If writing into the file 102 is not specified with this field, then there would be no other use for this field during that microinstruction. With this implementation, during an instruction which writes data into the register file 102, the contents of the bus 22 will be represented as zero at that time, even though data was originally on the bus 22. This latter condition is implemented by the address memory 40 (FIG. 2) whose inputs are connected to the instruction register 116 and the bus 22 under the control of the signal ZERO BUS. The bus 22 is zero when the ZERO BUS signal is true, which signal is generated whenever the microinstruction specifies that the register file 102 be loaded.

The advantages of using special function fields F1 and F2 can be illustrated by the function of loading the memory address register (MAR) 114. This is a function that is performed moderately often in a microprogram, conceivably every five microinstructions. This frequency of use is not such that it would justify a special bit in the instruction, but often enough so that it should be specified as a task-independent function. Therefore, Load MAR is in the first set of eight function F1's, i.e. F1=1. Similar rational is applied to the implementation of the remaining functions within the set of functions.

The left shift (F1=4), right shift (F1=5) and cycle (F1=6) fuctions control the shifter 144 which is responsive to the output of the L register 110. Sixteen bits of data are transferred from the L register 110 to the shifter 144 in parallel and 16 bits which are inputted to the shifter 144 can be left shifted, right shifted, or cycled by 8 with the result of the operation being transferred to the register file 102 to be stored. By the use of the function F1, values 4, 5, or 6, these task independent functions may be specified.

Tasks may be switched to higher priority wake-up requests by the use of the function 1, value 2 (F1=2). Current task wake-up may be disabled by the use of the function 1, value 3 (F1=3). The function 1, value 7 instructs that a literal constant be fetched from the constant memory 128. There are preferably up to 256 literal constants stored in the constant memory 128, the addressing of which requires 8 bits. One of these literal constants is a 16-bit word defining a "seal" in the high order 8 bits thereof that should appear in each disk command block (DCB) stored in main memory 16. This is an important aspect of the present invention and will be described in more detail below.

The constant memory 128, in the preferred embodiment, may be implemented by a 256 × 16 PROM available from Microsystems International, type MD 6300, and is gated to the bus 22 by F1=7, F2=7 or BS ≧ 4 fields. The constant memory 128 is addressed by the 8-bit concatenation of RSELECT (signals A·B) and BS (signal D), as shown in FIG. 4. The intent in enabling constants with BS ≧ 4 is to provide a masking facility, particularly for the input device signal MOUSE and DISP bus source. This is facilitated because the processor bus 22 is arranged electrically such that it "ANDS" if more than one source is gated to it.

Up to 32 such mask constants can be provided for each of the 4 bus sources ≧ 4. For example, specific locations in memory are identified by constants representing their address to enable the microcode to communicate with the main program. Also, these constants may be used to implement masks, patterns and bits that the program wishes to contain. Otherwise, such features would have to be stored in the instruction memory 42 which would require an extra 16-bit field.

The gating of the constant memory 128 onto the bus 22 can occur simultaneously with the specification of another function by the other function field which does not enable the gating of the constant to the bus 22. If, for example, the rest of the instructions dictate that the F2 field be used for a branch, then the assembler will assign F1=7. Otherwise, it will assign F2=7.

The function 2's are normally branch conditions. Each of the F2 values specify the condition that must be satisfied for branches to occur. Specifically, the notation NEXT indicates the next address bus 50 (FIG. 2), which transfers the address of the next microinstruction. The left arrow (←) means "gets". Therefore, F2=1 indicates that NEXT gets NEXT or (bus equals $\phi$). This indicates that a branch will occur if the bus 50 equals $\phi$, or the output of the shifter 144 is less than $\phi$ or equal to $\phi$, or will branch to the location specified by the bus 50. An address when generated allows a jump to the location addressed in the instruction memory 42 or a branch if the ALU 120 produces a carry out on the last operation from which it was used.

F2=6 provides for a STORE which says that the data that is currently on the bus 22 be written into the main memory store 17 during this microinstruction cycle. Since the main memory store 17 is much slower than the cycling of the processor itself, it takes four cycles before a STORE is performed. In the first cycle, the address register 114 is loaded, on the next two cycles, operations may be performed elsewhere in the processor, and in the fourth cycle, data is actually stored in the main memory store 17.

Task dependent (specific) functions are provided by function values in the F1 and F2 fields which are greater than 7, i.e. between 10 and 17. The following table gives for each of tasks $\phi$, 1 and 2 a number in the priority scheme and their specific functions. The remaining tasks 3-N are not set forth herein since they form no part of the present invention. Details of these tasks, however, if desired, may be obtained through a review of parent applications Ser. Nos. 518,555 and 733,640.

| | F1 (TASK SPECIFIC) | | |
|---|---|---|---|
| | CPU-0 | KSEC-1 | KWD-2 |
| 10: | SWMODE | — | — |
| 11: | WRTRAM | STROBE | STROBE |
| 12: | RDRAM | KSTAT ← | KSTAT ← |
| 13: | — | INCRECNO | INCRECNO |
| 14: | — | CLRSTAT | CLRSTAT |
| 15: | — | KCOMM ← | KCOMM ← |
| 16: | — | KADR ← | KADR ← |
| 17: | START | KDATA ← | KDATA ← |

| | F2 (TASK SPECIFIC) | | |
|---|---|---|---|
| | CPU-0 | KSEC-1 | KWD-2 |
| 10: | BUSODD | INIT | INIT |
| 11: | MAGIC | RWC | RWC |
| 12: | DNS | RECNO | RECNO |
| 13: | ACEST | XFRDAT | XFRDAT |
| 14: | IR | SWRNRDY | SWRNRDY |
| 15: | IDISP | NFER | NFER |
| 16: | ACSOURCE | STROBON | STROBON |
| 17: | — | — | — |

As discussed above, task $\phi$ is the main microprogram and always in requesting service. Tasks 1 and 2 are generated by the disk drive controller 18$_{(1)}$. Task 1 is a sector task (KSEC) and task 2 a word task (KWD). Specific details of the main microprogram, task $\phi$, may be had from a review of Appendix A hereto, as well as the above-referenced parent applications Ser. Nos. 518,555 and 733,640. The two microcoded tasks 1 and 2 will be described below with reference to the disk drive controller 18$_{(1)}$ and disk drive 20$_{(1)}$, and further more specific details thereof may be had from a review of Appendix A hereto and parent applications Ser. Nos. 518,555 and 733,640.

The disk drive controller $18_{(1)}$ is preferably designed to accommodate and control a variety of disk drives. In the exemplary system of FIG. 1, a Diablo Model 31 or 44 disk drive may be used as the disk drive $20_{(1)}$. The Diablo Model 31 disk drive has a single removable recording disk whereas the Diablo Model 44 disk drive has both a single fixed and a single removable recording disk. In both drives, there are two electromagnetic read/write heads, one for each disk recording surface. Information is desirably recorded on each disk recording surface in a 12-sector format. The Diablo Model 31 has 203 tracks per disk surface and the Diablo Model 44 has 406 tracks per disk surface. Further details of the specifications of each of these two exemplary disk drives are disclosed in the aforementioned parent applications Ser. Nos. 518,555 and 733,640. It will be appreciated that other suitable disk drives may be employed in the data processing system of FIG. 1.

The disk drive controller $18_{(1)}$ is capable of recording three independent blocks of data in each sector of each track on a disk recording surface. Each block is followed by a single "checksum" word to facilitate error detection. The first block of data is desirably two, 16-bit words long and is intended to define the address of the recording position, i.e. the disk surface and the track and sector location thereon. This first block is called the "header" block. In accordance with a unique aspect of the present invention, the second block of data capable of being recorded by the disk drive controller $18_{(1)}$ on each sector of each track is a "label" block, which is desirably eight, 16-bit words in length. The unique function and purpose of this block will be described below. The third block of data capable of being recorded in each track sector is a "data" block and is preferably 256, 16-bit words in length. The data block contains a "page" of a particular data "file" to be stored in that track sector.

Each of these three blocks may be independently written, read or checked, except that writing, once begun, must continue until the end of the data block. When a block is checked, information on the disk is compared word for word with a specified block of main memory store 17. During checking, a main memory word containing $\phi$ has special sigificance. When this word is encountered, the matching word read from the disk is stored in its place and does not take part in the check. This feature permits a combination of reading and checking to occur in the same block.

The label block recorded in each track sector contains a number of bits defining the name and/or number of the "file" of the data in the data block recorded in that sector. As mentioned above, the file data in each data block represents a "page" of data from the file. A special reserved file number is used to indicate that a page is "free" and is not contained in any existing filed. Each label block also contains a number of bits defining a pointer to the storage location on the disk of the next page of the particular file. In accordance with the preferred embodiment, each 8 word × 16 bit = 128 bit label contains the following fields:

bits $\phi$–15: Pointer to next page of file
bits 80–127: File name and/or number By recording a block of label data in each sector of every track with the above information therein, an important redundancy is established. Thus, if the "file directory" recorded on a disk surface is destroyed or damaged due to head crash or the like, the location of each file can nonetheless be ascertained by reading the non-damaged data on the disk. The file directory can then be reconstructed and re-recorded simply by reading the label data recorded in each track sector. This benefit of the invention embraces the system with the desired attribute of "security." As another benefit, the presence in each sector of a label block that can be read just prior to writing file data onto that sector provides a last instant check just before such write operation that the page of file data to be written corresponds to the proper file, as identified by the label block. This benefit embraces the added security with the desired attribute of "efficiency." A third benefit of the label block of this invention has to do with the manner in which it is stored and accessed from the main memory store 17, and such benefit will be described below.

The main program communicates with the disk drive controller $18_{(1)}$ via a four-word block of main memory store 17 beginning at location KBLK. The first word is interpreted as a pointer to a chain of disk command blocks (DCB's). If the first word contains $\phi$, the disk drive controller $18_{(1)}$ will remain idle. Otherwise, the disk drive controller $18_{(1)}$ will commence execution of the command contained in the first DCB. When a command is completed successfully, the disk drive controller $18_{(1)}$ stores in KBLK a pointer to the next command in the chain and the cycle repeats. If a command terminates in error, a $\phi$ is immediately stored in KBLK and the disk drive controller $18_{(1)}$ idles. At the beginning of each track sector, status information, including the number of the current sector, is stored in KBLK+1. This can be used by the main program to sense the readiness of the disk drive $20_{(1)}$ and to schedule disk data transfers, for example.

When the disk drive controller $18_{(1)}$ begins executing a command, it stores the disk address of that command in KBLK+2. This information is later used by the disk drive controller $18_{(1)}$ to decide whether seek operations or disk switches are necessary. It can be used by the main program for scheduling disk arm motion. If the main program stores an illegal disk address (such as −1) in this word, the disk drive controller $18_{(1)}$ will perform a seek at the beginning of the next disk operation. This is useful, for example, when the operating system wants to force a restore operation. The disk drive controller $18_{(1)}$ also communicates with the main program by interrupts. At the beginning of each sector, interrupts are initiated on the channels specified by the bits in KBLK+3.

The functions of these main memory store locations may be summarized as follows:

KBLK: Pointer to first disk command block
KBLK+1: Status at beginning of current sector
KBLK+2: Disk address of most-recently started disk command
KBLK+3: Sector interrupt bit mask Each DCB contains ten, 16 bit words which together describe a disk transfer operation to the disk drive controller $18_{(1)}$, and which are also used by the controller $18_{(1)}$ to record the status of that operation. The first word in each DCB is a pointer to the next DCB in this chain. A $\phi$ means that this is the last DCB in the chain. When the command is complete, the disk drive controller $18_{(1)}$ stores its status in the second word. The third word contains the command itself, telling the disk drive controller $18_{(1)}$ what to do. The fourth word contains a pointer to the block of main memory from/to which the disk header block will be transferred. The fifth word contains a similar pointer for the label block. The sixth word contains a similar pointer for the data block. The seventh and eighth words of each DCB control the initiation of interrupts when the command block is finished. If the command terminates without error, interrupts are initiated on the channels specified by the bits in DCB+6 (the seventh word). However, if the command terminates with an error, the bits in DCB+7 (the eight word) are used instead. The ninth word is preferably unused by the disk drive controller $18_{(1)}$, and may be used by the main program to facilitate chained disk operations. The tenth word contains the disk address at which the current operation is to take place.

The ten words of each DCB may be summarized as follows:
    DCB: Pointer to next command block (DCB)
    DCB+1: Status
    DCB+2: Command
    DCB+3: Header block pointer
    DCB+4: Label block pointer
    DCB+5: Data block pointer
    DCB+6: Command complete no-error interrupt bit mask
    DCB+7: Command complete error interrupt bit mask
    DCB+10: Currently unused
    DCB+11: Disk address A disk address word A (from DCB+11) desirably contains the following fields (ranges being expressed in octal radix):

| Field | Range | Significance |
|---|---|---|
| A[0-3] | 0-13 | Sector number |
| A[4-12] | 0-625 for Model 44<br>0-312 for Model 31 | Track number |
| A[13] | 0-1 | Head number |
| A[14] | 0-1 for Model 44<br>0 for Model 31 | Disk number (see also C[15])<br>(0 is removable pack on Model 44) |
| A[15] | 0-1 | 0 normally, 1 if track 0 is to be addressed via a hardware "restore" operation |

A disk command word C (from DCB+2) desirably contains the following fields:

| Field | Range | Significance |
|---|---|---|
| C[0-7] | 110 | SEAL-checked to verify that this is a valid disk command |
| C[8-9] | 0-3 | 0 if Header block read i<br>1 if Header block to be checked<br>2 or 3 if Label block to be written |
| C[10-11] | 0-3 | 0 if Label block to be read<br>1 if Label block to be checked<br>2 or 3 if Label block to be written |
| C[12-13] | 0-3 | 0 if Data block to be read<br>1 if Data block to be checked<br>2 or 3 if Data block to be written |
| C[14] | 0-1 | 0 normally<br>1 if the command is to terminate immediately after the correct track position is reached (before any data is transferred) |
| C[15] | 0-1 | XOR'ed with A[14] to yield hardware disk number |

A disk status word S (from DCB+1) desirably has the following fields:

| Field | Values | Significance |
|---|---|---|
| S[0-3] | 0-13 | Current sector number |
| S[4-7] | 17 | (One can tell whether status has been stored by setting this field initially to 0 and then checking for non-zero) |
| S[8] | 0-1 | 1 means seek failed, possibly due to illegal track address |
| S[9] | 0-1 | 1 means seek in progress |
| S[10] | 0-1 | 1 means disk unit not ready |
| S[11] | 0-1 | 1 means data or sector processing was late during the last sector. Data and current sector number unreliable |
| S[12] | 0-1 | 1 means disk interface was not transferring data last sector |
| S[13] | 0-1 | 1 means checking sum error Command allowed to proceed |
| S[14-15] | 0-3 | 0 means command completed correctly<br>1 means hardware error (see S[8-11]) or sector overflow<br>2 means check error. Command terminated instantly.<br>3 means disk command specified illegal sector. |

As alluded to earlier, a "seal" is defined in the constant memory 128 at one address location thereof, and is a single 8-bit word, i.e. the high order 8-bits of a constant memory word. This seal is used to verify the validity of a block of disk command data (DCB). More specifically, and as indicated above, the 8 high order bits ($\phi$-7) of the disk command word C of a valid DCB should contain the 8-bit seal therein exactly corresponding in value to the 8-bit seal in the constant memory 128.

In verifying the validity of a disk command block, the 8-bit seal from the constant memory 128 is "Exclusive-ORed" under program control with the high order 8-bits of the command word C. If the high order 8-bits contain the identical value of the seal in constant memory 128, then the resultant of the Exclusive OR operation will be eight binary zeros. The program checks, therefore, for the presence of eight binary zeros and, if such is detected, the disk command block has been verified as valid. Further specific details on how the above-described verification operation is performed are disclosed in the exemplary microcode included in Appendix A hereto. Generally speaking, however, the 16-bit word from the constant memory 128 containing the 8-bit seal is first loaded from the bus 22 into the T-register 106 and is then supplied along lines 107 into the ALU 120. The ALU 120 additionally receives from the bus 22 the disk command word C accessed from main memory store 17. The ALU 120 is then programmed to perform the Exclusive-OR function alluded to above. With respect to the high order 8-bits of each of these two words, the high order 8-bits of the resultant 16-bit word should contain all binary zeros. If not, it means that an invalid disk command block has been accessed.

The disk drive controller $18_{(1)}$ in accordance with the invention, allows one to chain disk reads through respective label blocks, i.e., the label block for sector n contains part of the DCB for reading N+1, etc.

Figure 5:
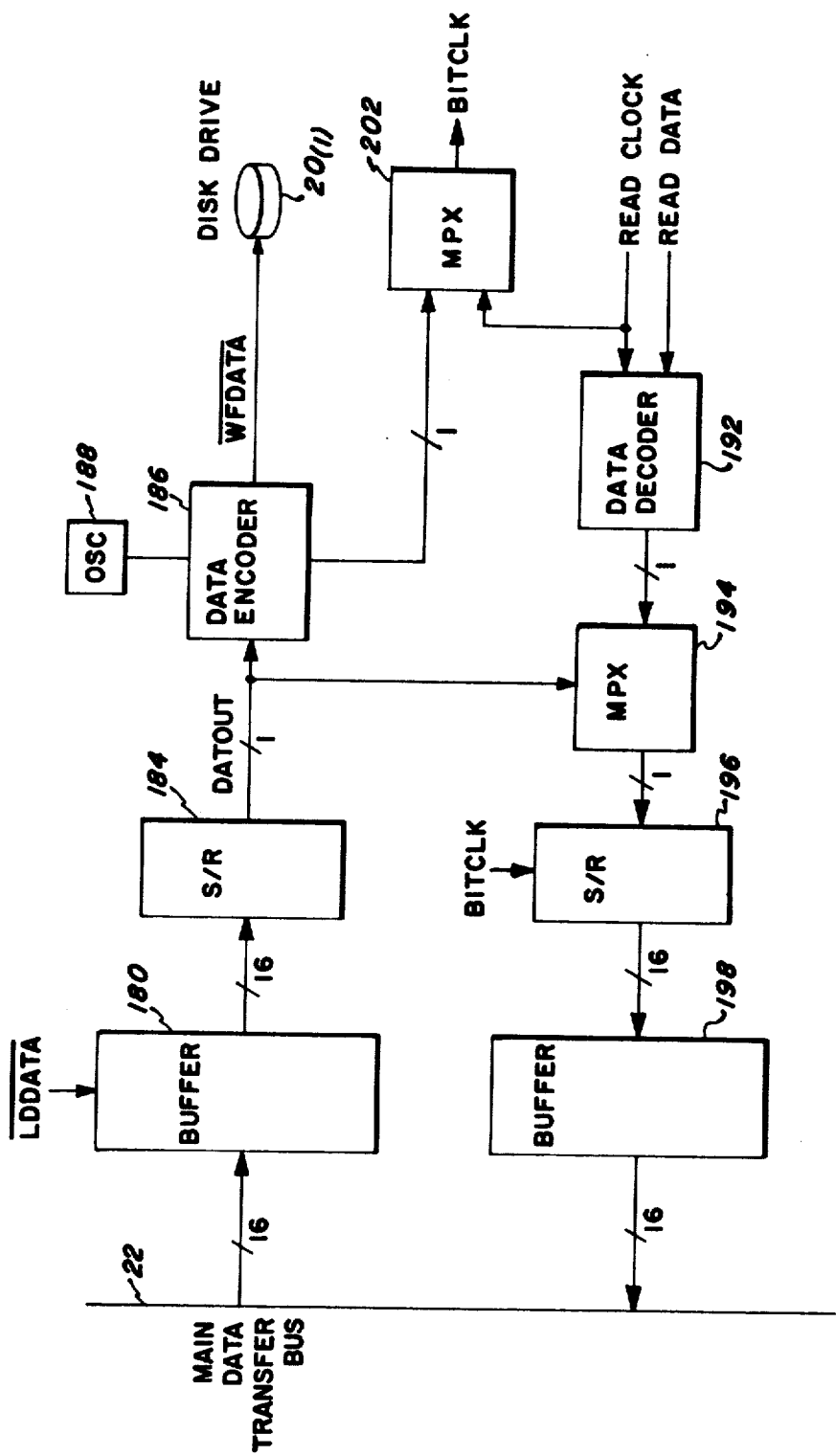
FIG. 5 is a block diagram of the data paths of the disk drive controller shown in FIG. 1.

A preferred disk drive controller $18_{(1)}$ is implemented by the logic shown in FIGS. 4-16 and the microcode tasks alluded to above, namely the sector task (KSEC) and the word task (KWD). The data paths in the disk drive controller 18(1) are shown in FIG. 5. Data is loaded from the bus 22 into a buffer 180 where it is buffered before being loaded into a shift register 184. The register provides a serial transfer of data indicated by the output signal DATOUT which is phase encoded into the signal WRDATA by a data encoder 186. An oscillator 188 clocks the data through the encoder 186 to the disk drive 20(1), for writing on a disk surface.

Data is read from a disk surface and decoded by a data decoder 192 whose output is multiplexed by a multiplexer 194 under control of the DATOUT signal from the shift register 184. The output of the multiplexer is shifted through a shift register 196 under control of the signal BITCLK for loading in a buffer 198. The signal BITCLK is a clock signal developed by a multiplexer 202 which is responsive to a clock signal approximately equal to one half the frequency of the signal generated from the oscillator 188 for the data encoder 186 and to the clock signal READCLOCK which enables the data decoder 192. Under control of the signal BITCLK, the buffer 198 transfers groups of 16 bits of data to the bus 22 in parallel.

Figure 6:
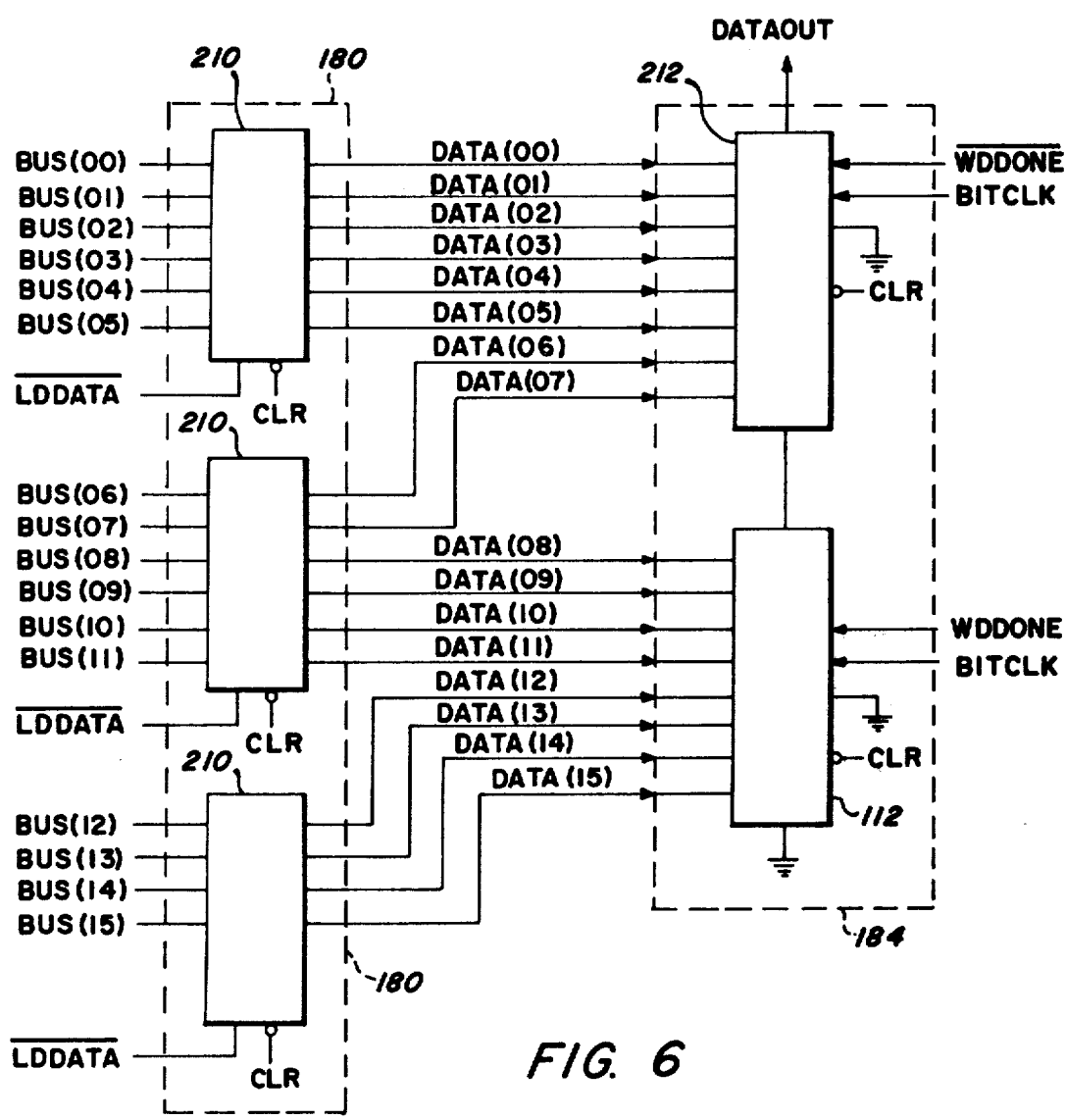
FIG. 6 is a schematic drawing of the write buffer and shift register shown in FIG. 5.
Figure 7:
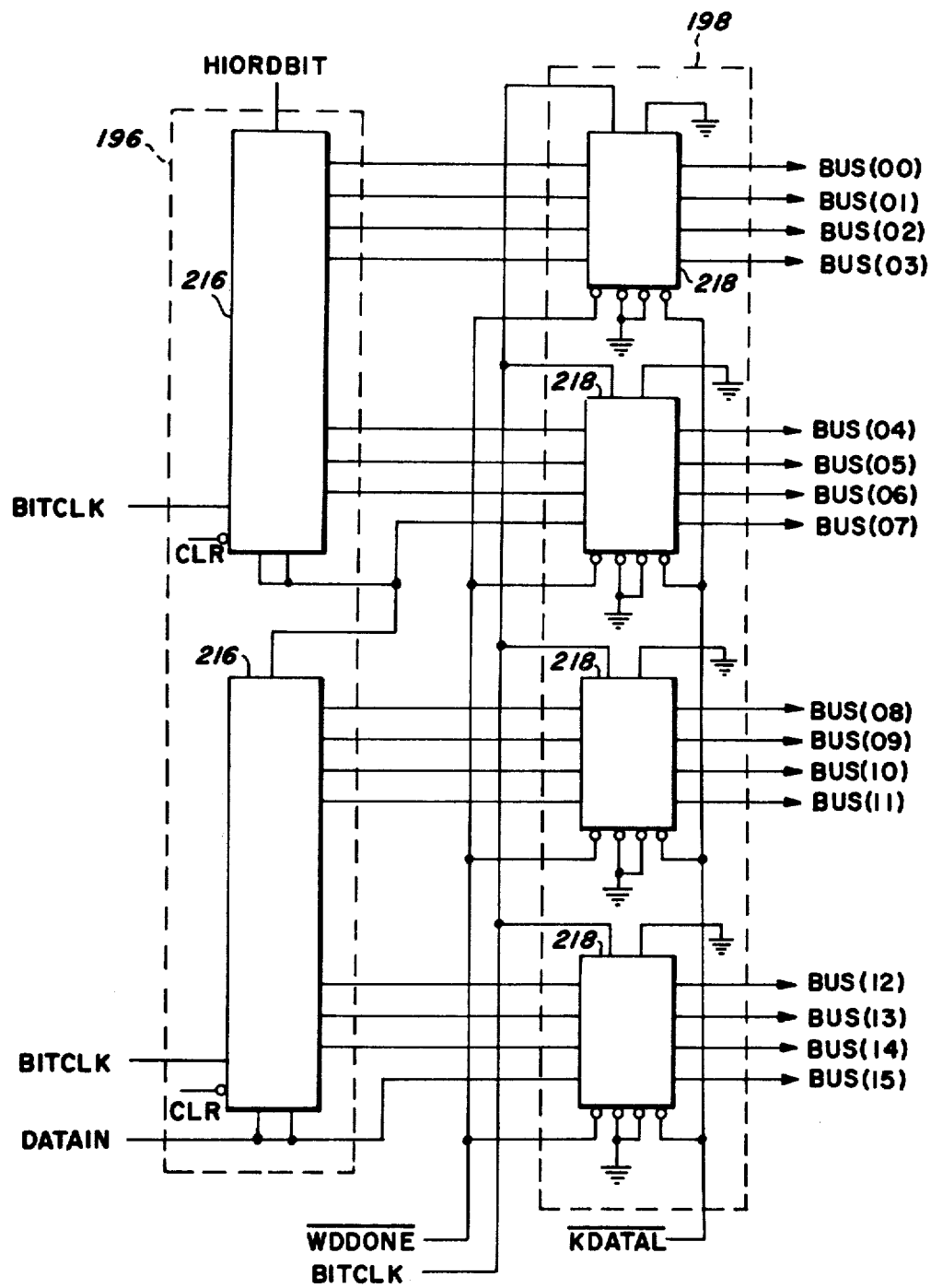
FIG. 7 is a schematic drawing of the read buffer and shift register shown in FIG. 5.

In FIG. 6 is shown the buffer 180 which is loaded by the 16 bits from the bus 22 under control of the $\overline{\text{LDDATA}}$ signal. The buffer 180 is comprised of latches 210, preferably type 74174 by Texas Instruments. The output of the buffer 180 is shifted out of the shift register 184 as represented by the signal DATOUT under control of BITCLK and $\overline{\text{WDDONE}}$ signals. The shift register 184 is desirably implemented by two 8-bit shift registers 212, type 74166 by Texas Instruments. The shift register 196 is shown in FIG. 7 as being comprised of two shift register elements 216, preferably type 74164 by Texas Instruments. The output of the shift register 196 is received by the buffer 198 which is comprised of four latches 118, desirably type 8T10 by Signetics.

Figure 8:
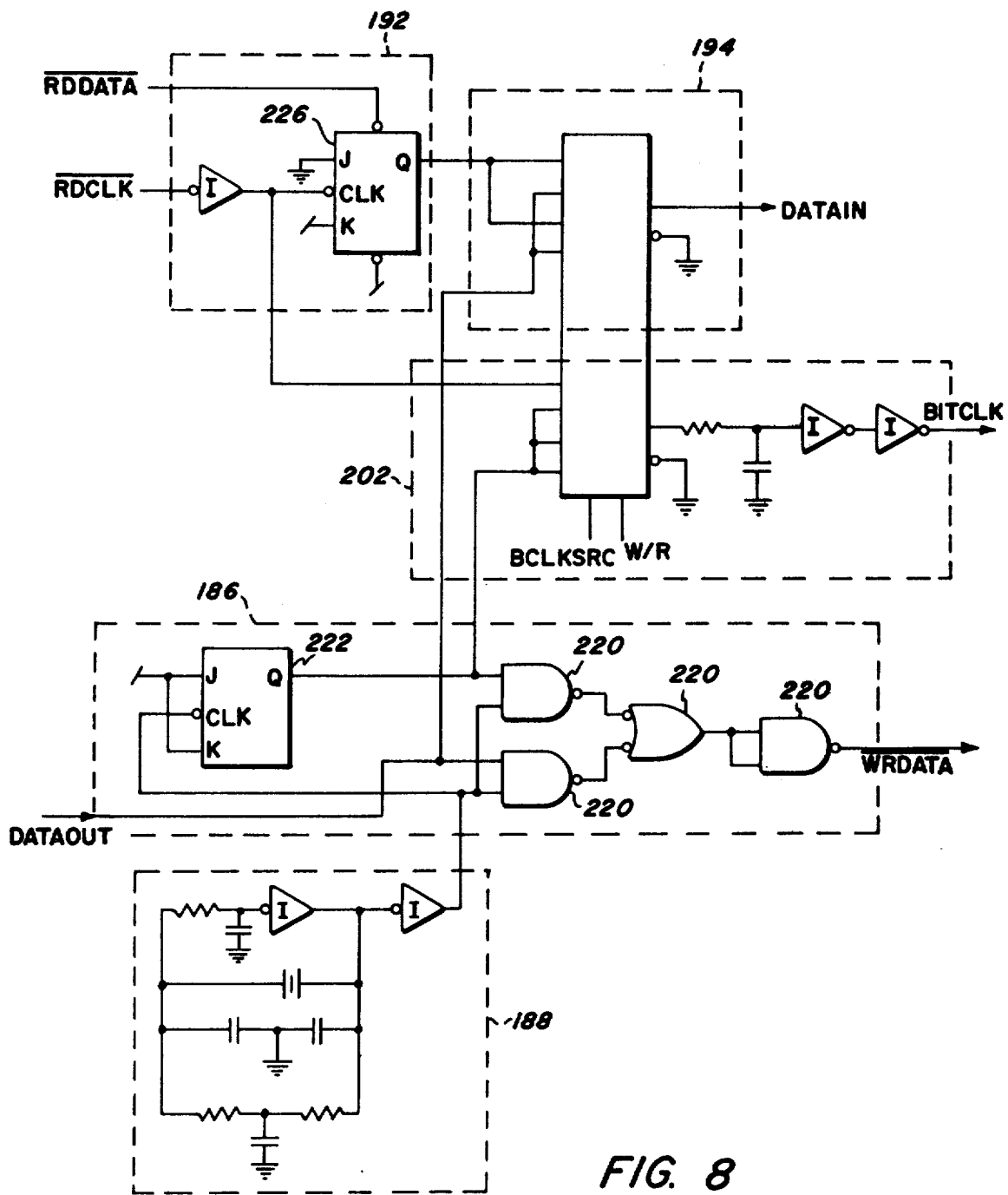
FIG. 8 is a schematic drawing of the encoder, decoder, and multiplexers shown in FIG. 5.

As shown in FIG. 8, the data encoder 186 phase encodes the signal DATOUT into the output signal $\overline{\text{WRDATA}}$ by means of the gating structure 220 under control of clock signals from the output of the flip-flop 222 and the crystal oscillator 188. Since the output of the crystal oscillator 188 clocks the flip-flop 222, the output of the flip-flop 222 is at one half the frequency of the frequency characterizing the output of the oscillator 188. The flip-flop 222 provides information about which half of the bit cell is being processed. In the flip mode, one half of the bit cell is identified; in the flop mode, the other half of the bit cell is identified. Thereby, a pulse is generated at the output of the gating structure 220 if the Q output of the flip-flop 222 is active. If the Q output is not active, then a pulse will only be generated if the DATOUT signal is active.

The $\overline{\text{RDDATA}}$ is decoded by the decoder 192 under control of the signal $\overline{\text{RDCLK}}$. The decoder 192 is preferably implemented by a j-k type flip-flop 226, whose Q output is connected to the multiplexer 194. The multiplexer 194, under control of the DATOUT signal, generates the input signal DATAIN to the shift register 196. The multiplexer 194 is desirably implemented by a dual 4-line to 1-selector, type 74S153 by Texas Instruments. The multiplexer 202 is desirably implemented by the same type of selector.

Figure 9:
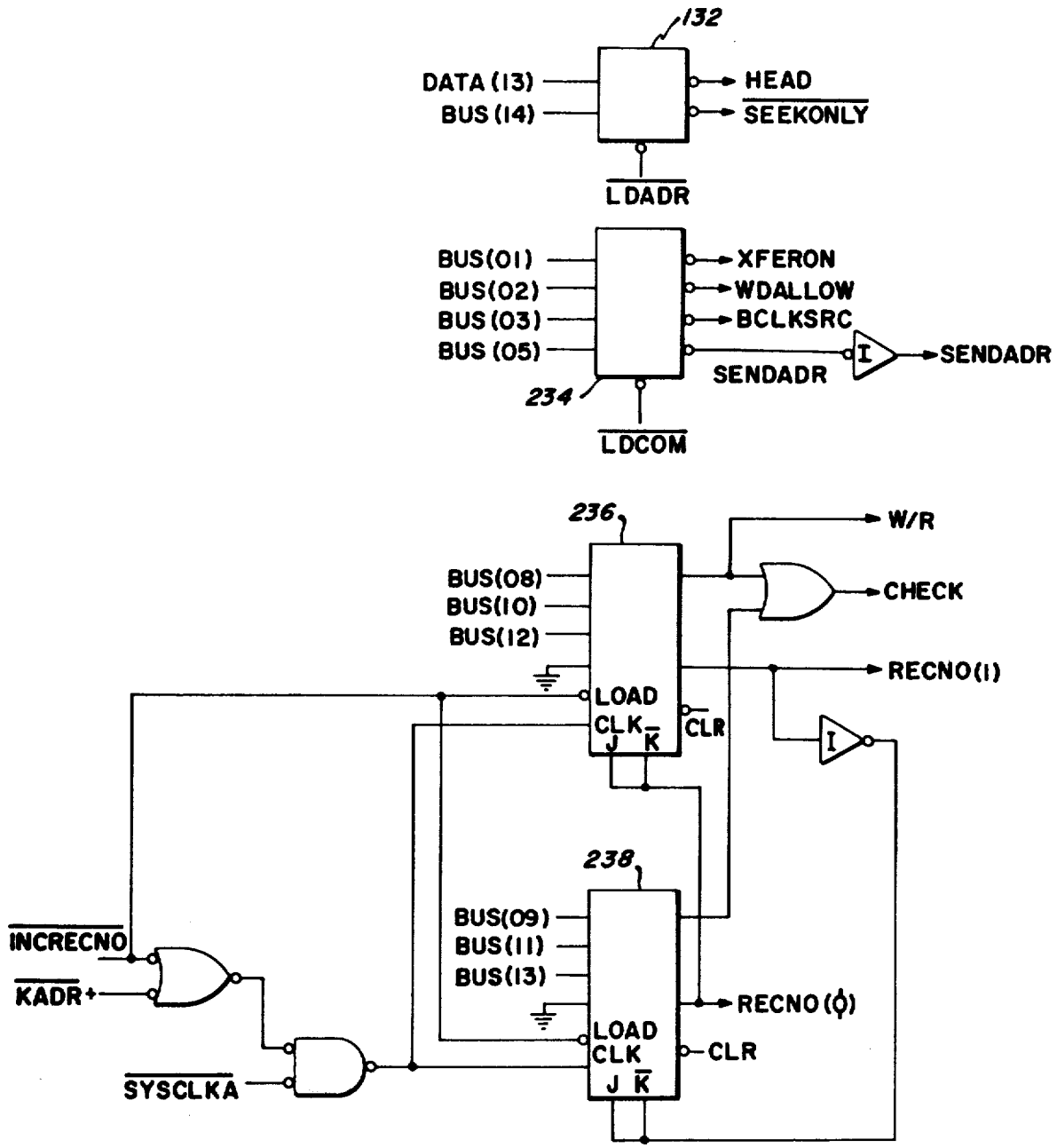
FIG. 9 is a schematic drawing of the command register of the disk drive controller shown in FIG. 1.

Referring to FIG. 9, command signals in the disk drive controller 18(1) are generated by a command register 230. The elements 232 and 234 are latches, preferably of the type 3404 by Intel, which provide the indicated signals under control of $\overline{\text{LDADR}}$ and $\overline{\text{LDCOM}}$, respectively. The elements 236 and 238 are latches preferably of the type 74195 by Texas Instruments, which provide additional command signals, including the read/write signal W/R.

Figure 10:
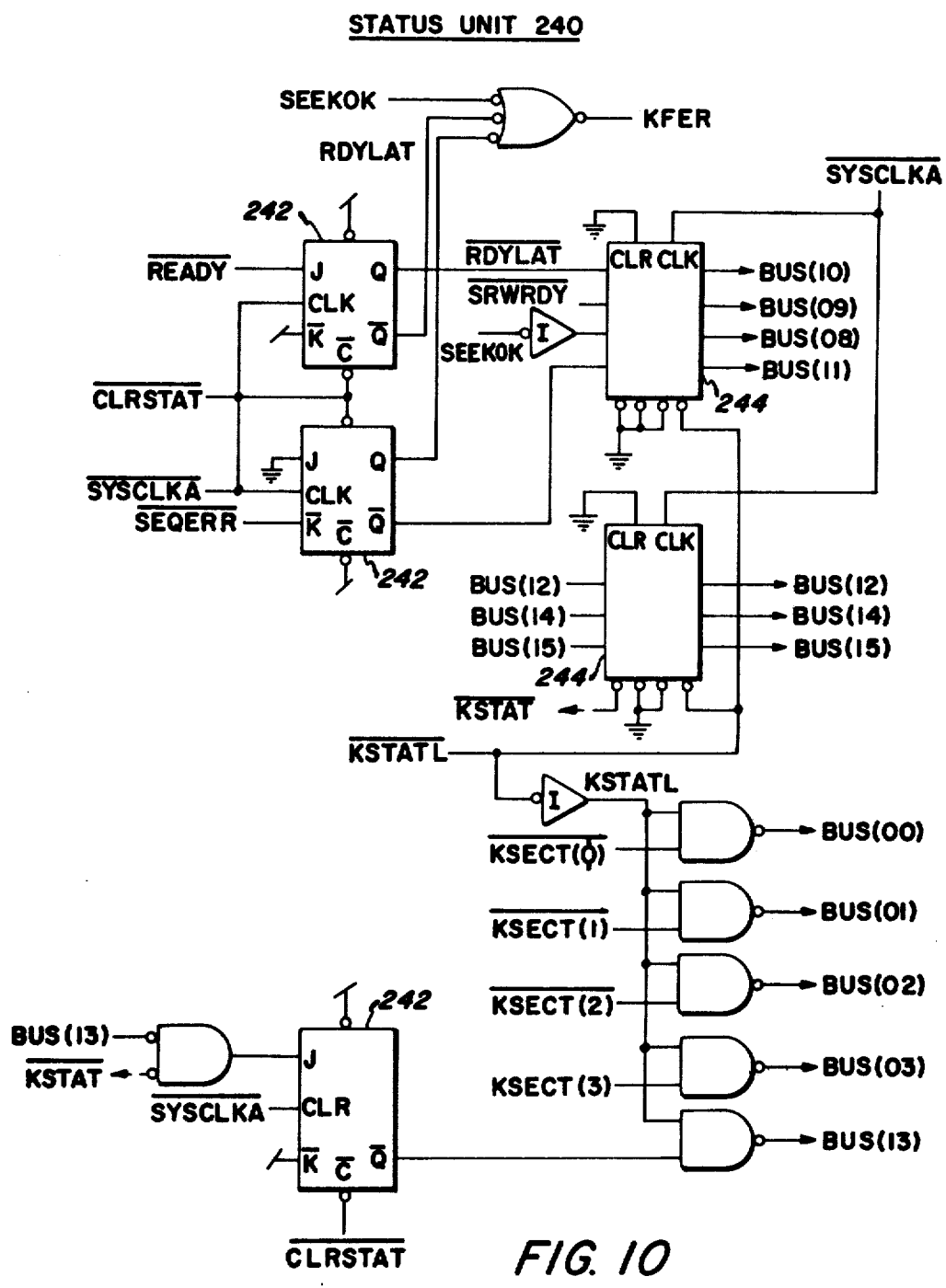
FIG. 10 is a schematic drawing of the status unit of the disk drive controller shown in FIG. 1.

In FIG. 10, a status unit 240 is shown whose logic elements provide status bits for the disk drive 20(1). Elements 242 are j-k flip-flops and elements 244 are latches, desirably type 8T10 by Signetics.

Figure 11:
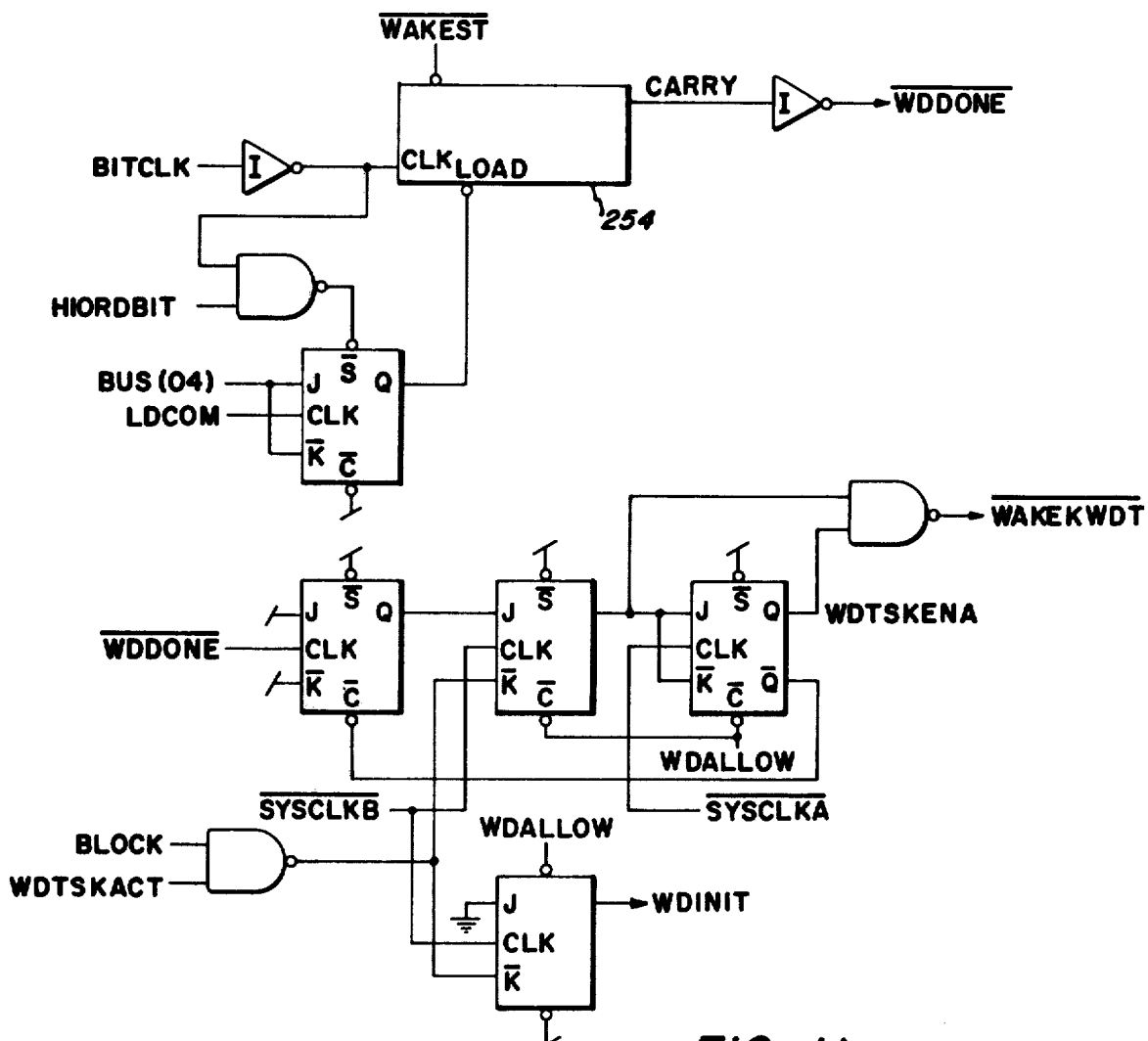
FIG. 11 is a schematic drawing of the word timing unit of the disk drive controller shown in FIG. 1.
Figure 12:
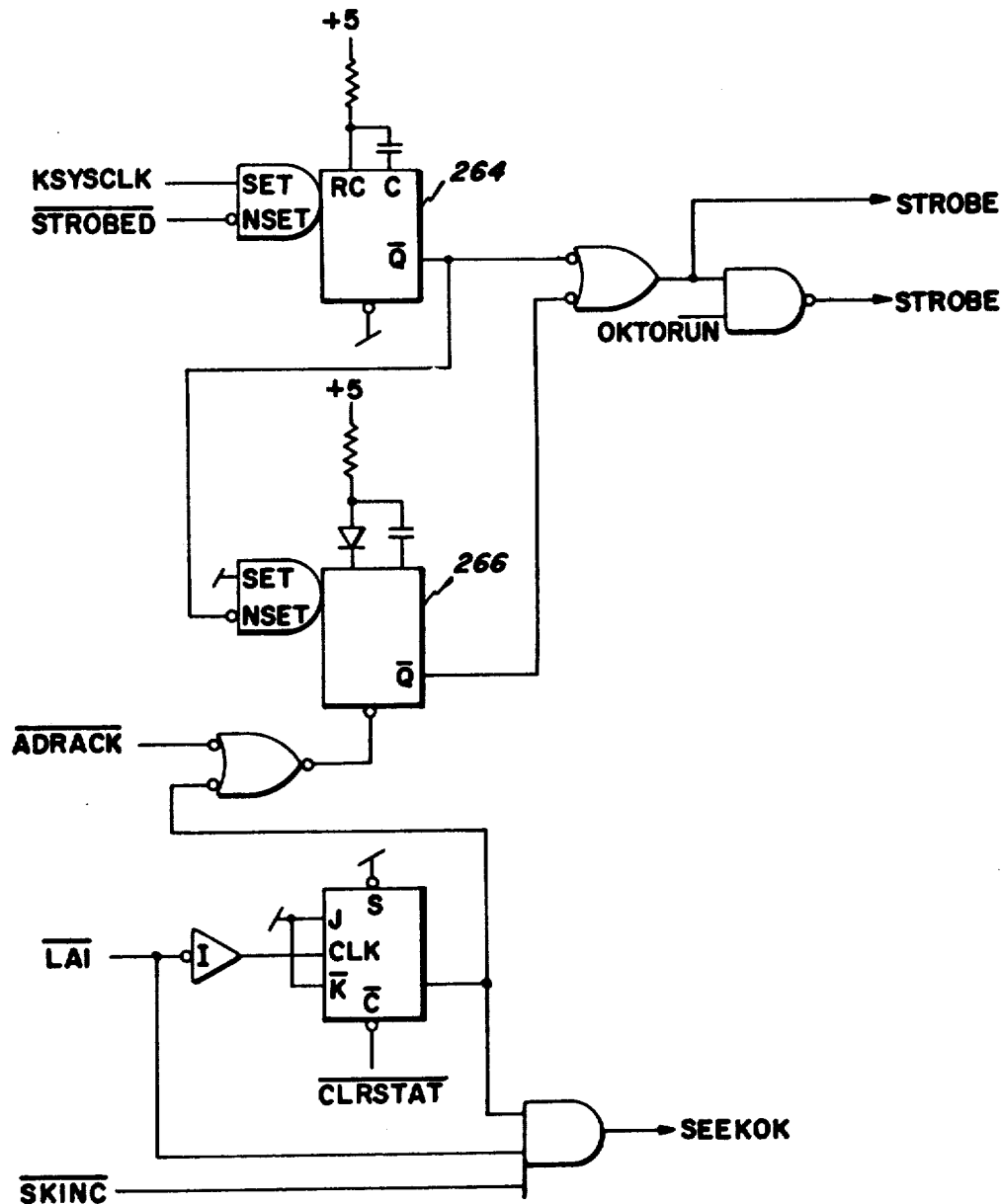
FIG. 12 is a schematic drawing of the strobe/seek generator of the disk drive controller shown in FIG. 1.

Referring now to FIG. 11, a word timing unit 250 is shown which provides the timing signals $\overline{\text{WDDONE}}$ (word done), $\overline{\text{WAKEKWDT}}$ (word display task wakeup), and WDINIT (word initialization). The logical elements shown include a synchronous 4-bit counter 254, preferably type 74161 by Texas Instruments. A strobe/seek generator 260 is shown in FIG. 12 to provide the STROBE and SEEKOK signals which are required by the disk drive 20(1) for head positioning. The logic elements 264 and 266 are 1-shot multivibrators, desirably type 74123 by Texas Instruments, which provide upper and lower limits to the STROBE signal. The signals ADRACK, LAI, and SKINC are generated by the disk drive 20(1).

Figure 13:
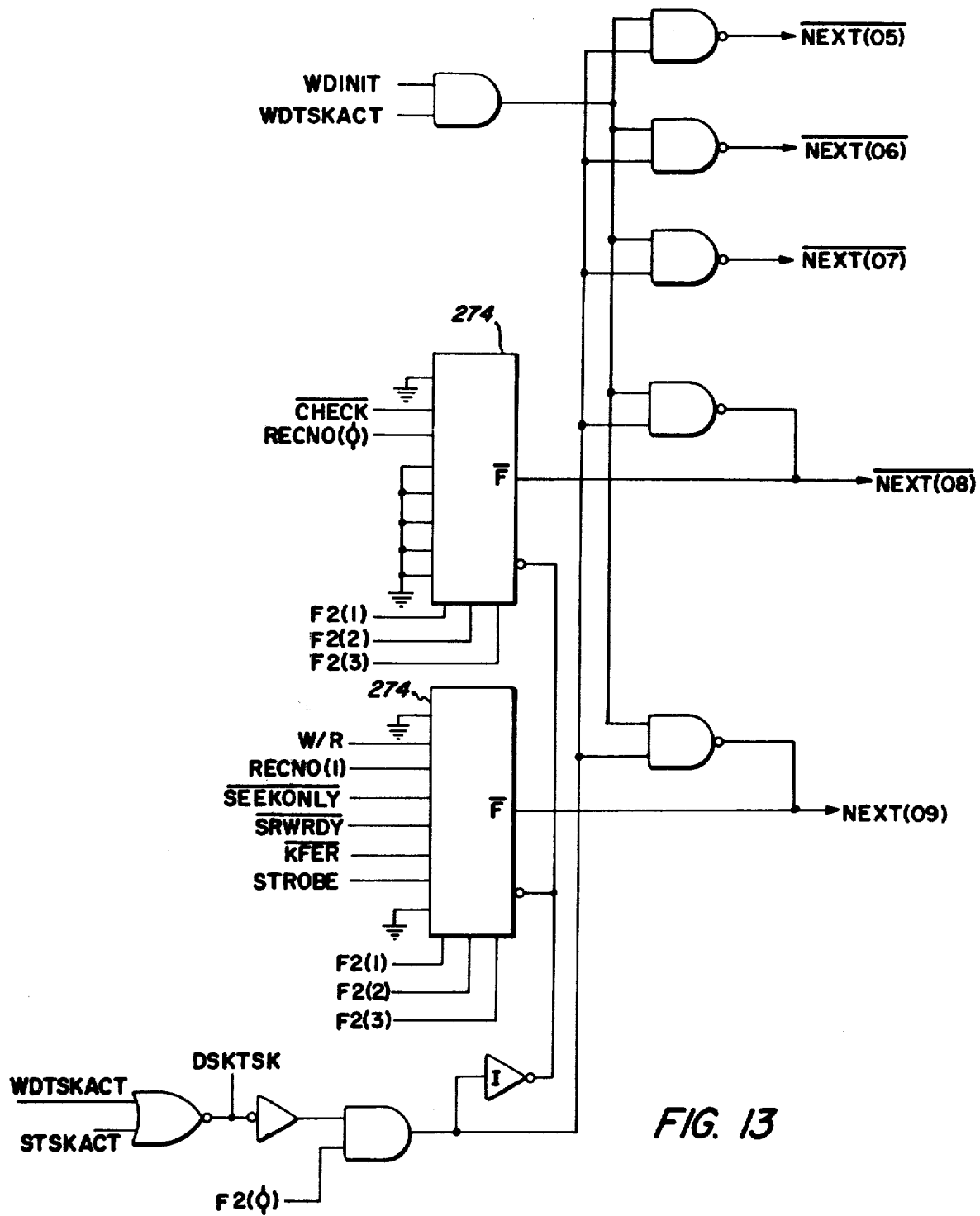
FIG. 13 is a schematic drawing of the address modifier of the disk drive controller shown in FIG. 1.

The NEXT address for the next microinstruction may also be modified by the disk drive controller 20(1) by means of an address modifier 270, shown in FIG. 13. The logic shown, which includes two multiplexers 274 desirably of the type 8231 by Signetics, allow the setting of the next field bits NEXT (05)-NEXT (09) to 1 after an error condition is detected and as soon as the word task active signal WDTSKACT is generated. The resetting of these bits to 1 returns control back to the beginning of the sector.

Figure 14:
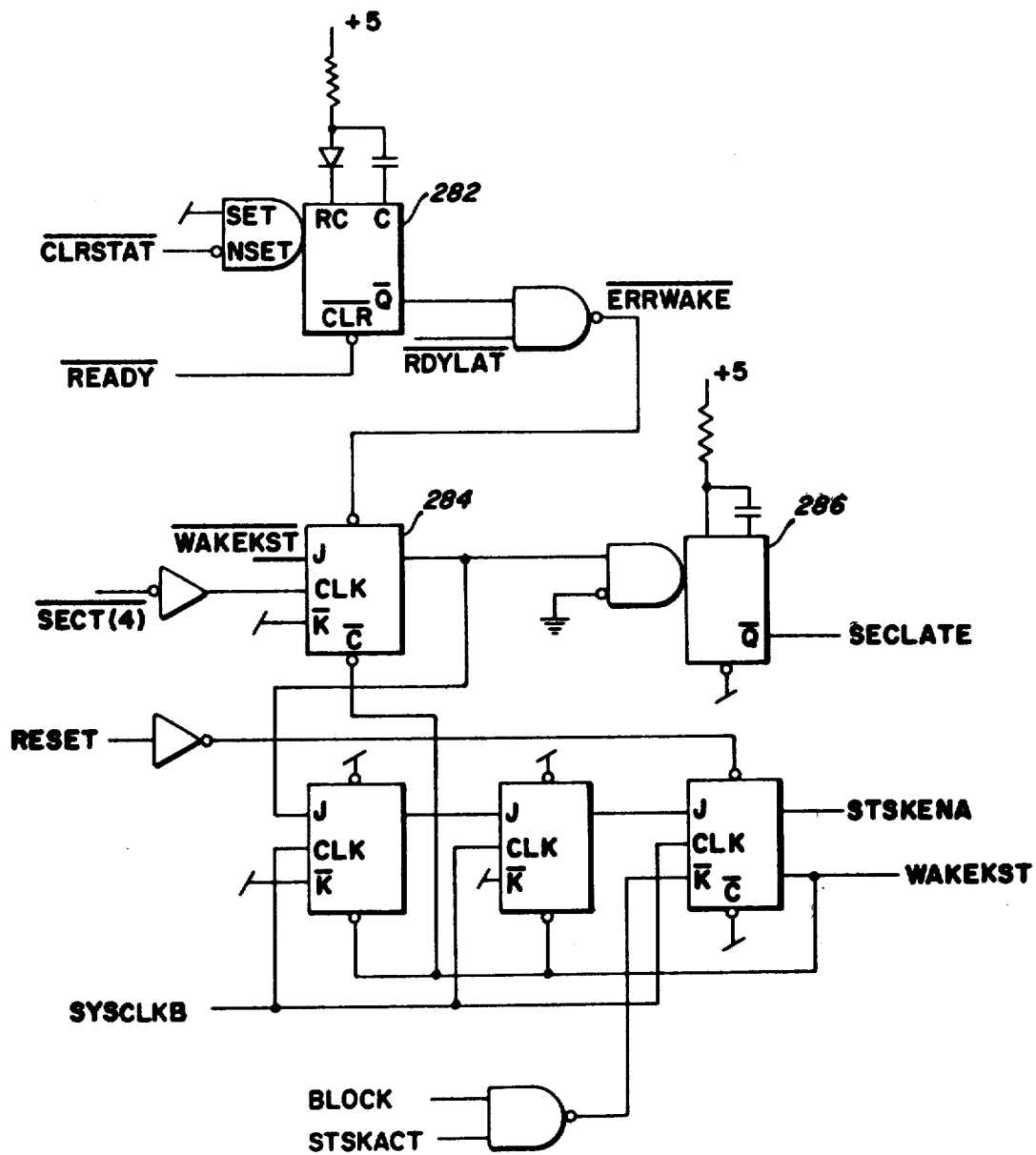
FIG. 14 is a schematic drawing of the sector/error wakeup generator of the disk drive controller shown in FIG. 1.

Sector and error wakeup requests are generated by the generator 280 shown in FIG. 14. The 1-shot multivibrator 282 initiates immediate action by the sector task ($\overline{\text{KSEC}}$) if the disk drive becomes unready and, in the event that the disk drive 20(1) continues in that state, simulated sector marks are generated from the clear error indication signal $\overline{\text{CLRSTAT}}$. When the disk drive 20(1) is ready, the signal READY would disable the generation of simulated sector marks. The j-k flip-flop 284 and a 1-shot multivibrator 286 serve as a timer to ensure timely sector task processing. The signal SECLATE is an error signal indicating that such processing has not been in time. The remainder of the logic shown provides for additional synchronization for developing the wakeup sector task signal $\overline{\text{WAKEKST}}$.

Figure 15:
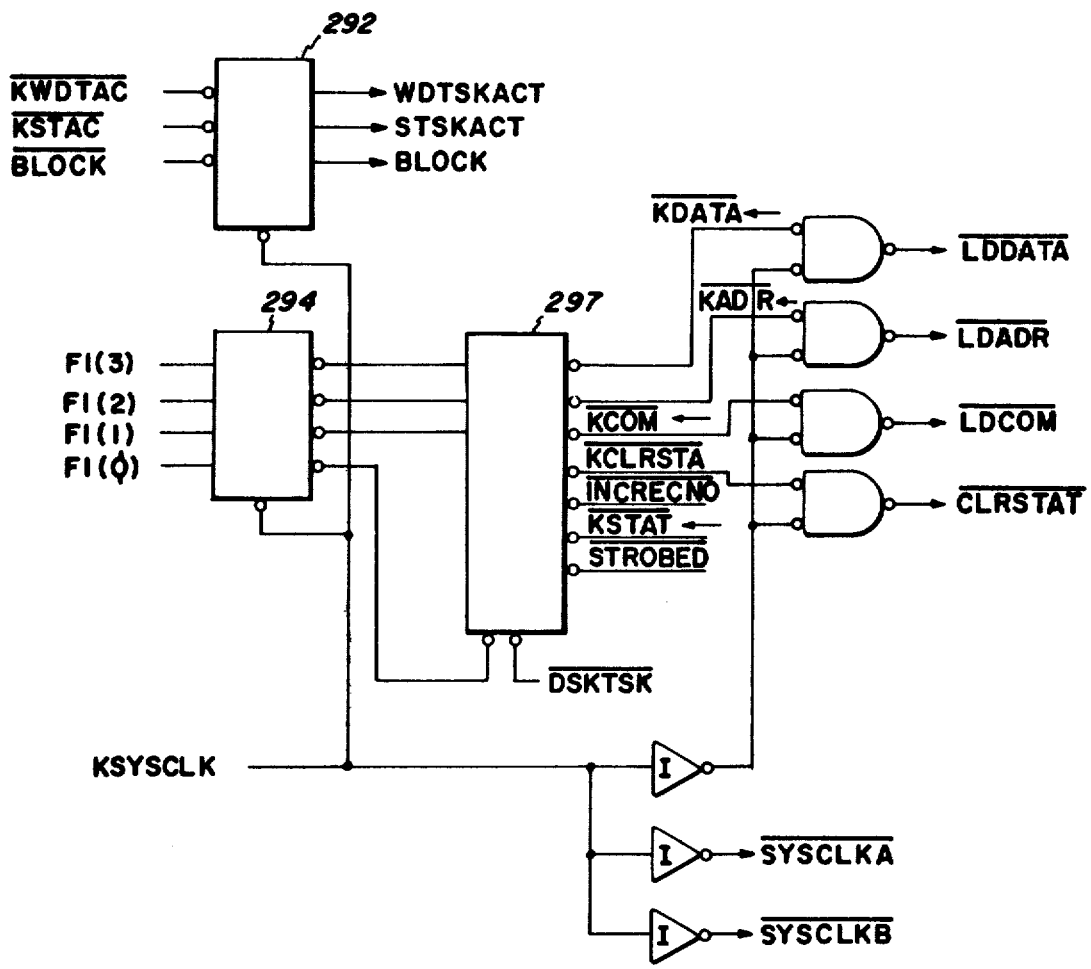
FIG. 15 is a schematic drawing of the F decoder of the disk drive controller shown in FIG. 1.

FIG. 15 depicts a decoder 290 for decoding the 4-bit F1 signal E (FIG. 3) applied thereto on control lines 47 (FIG. 2) into the respective command signals $\overline{\text{LDDATA}}$, $\overline{\text{LDCOM}}$ $\overline{\text{CLRSTAT}}$ under the condition of a disk task represented by the signal DSKTSK. The logic elements 292 and 294 are latches preferably of the type 3404 by Intel and the decoder element 297 is preferably of the type 3205 by Intel.

Figure 16:
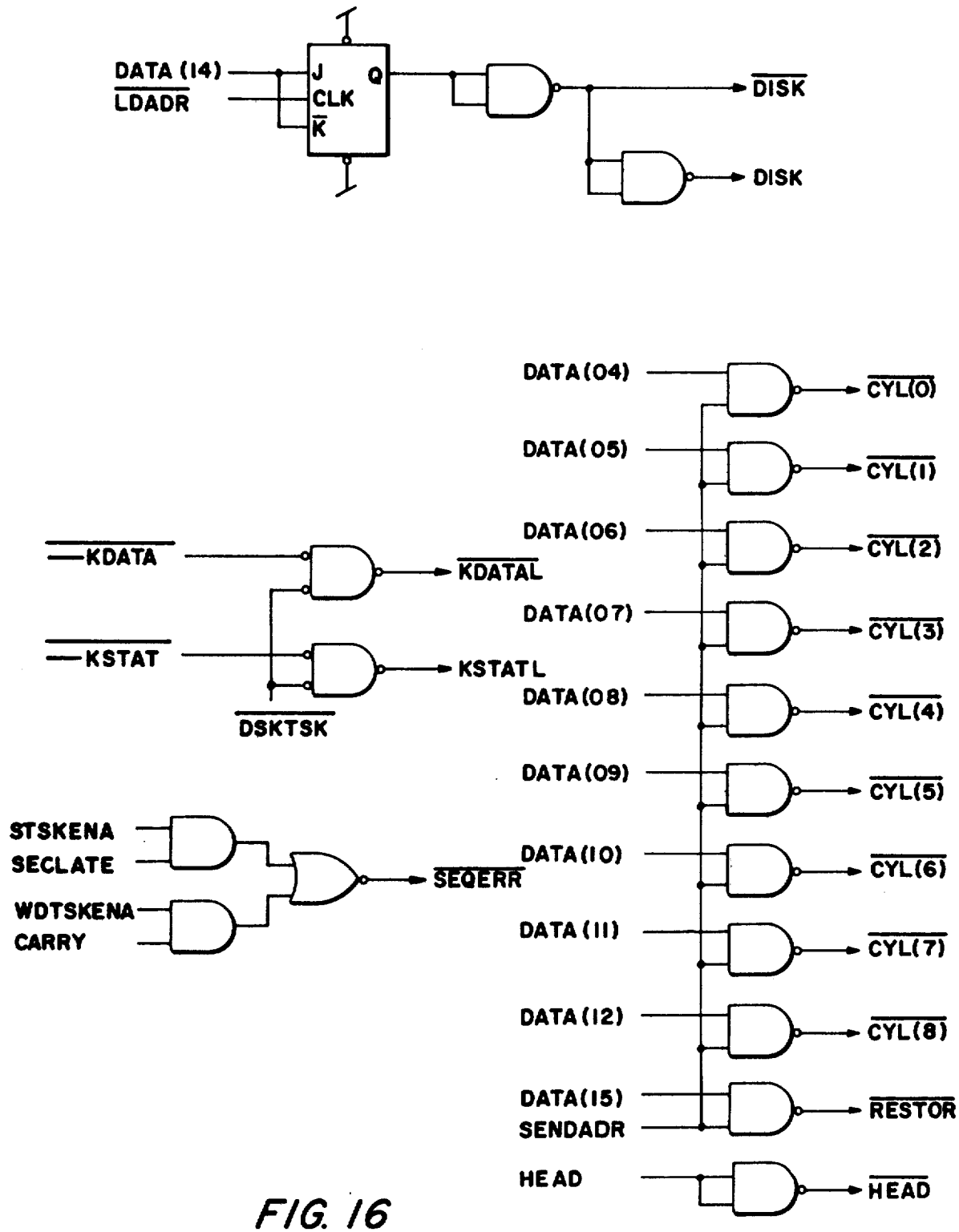
FIGS. 16 and 17 are schematic drawings of logic elements which generate various signals used by the disk drive and the disk drive controller shown in FIG. 1.
Figure 17:
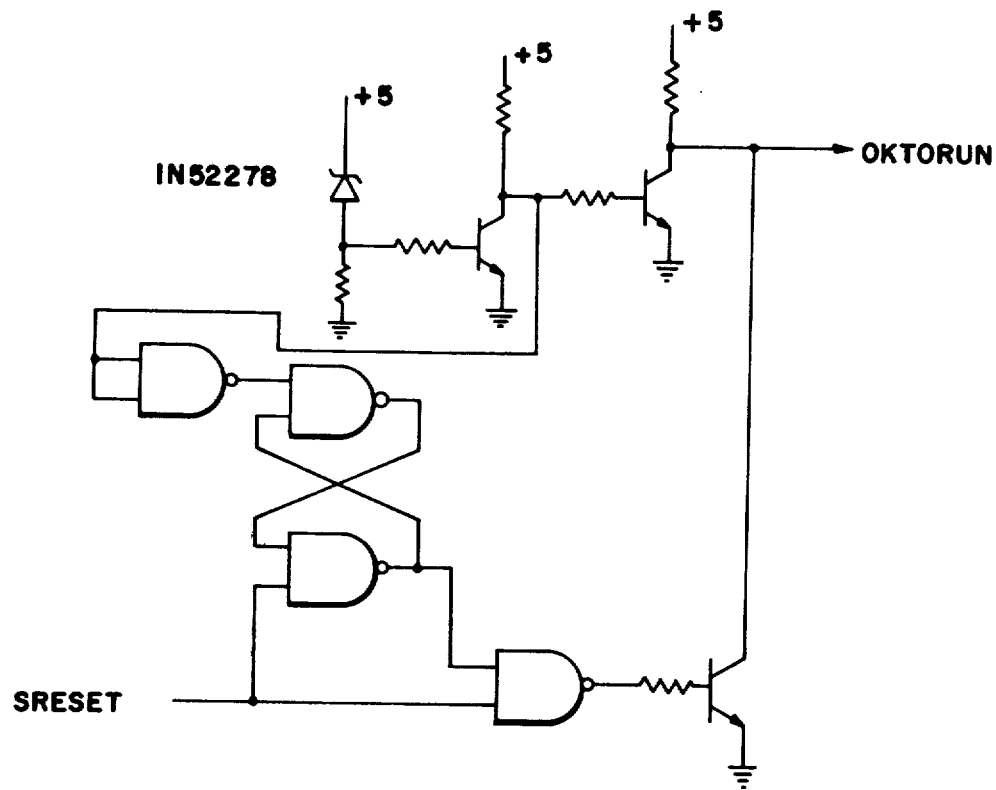
Figure 17:
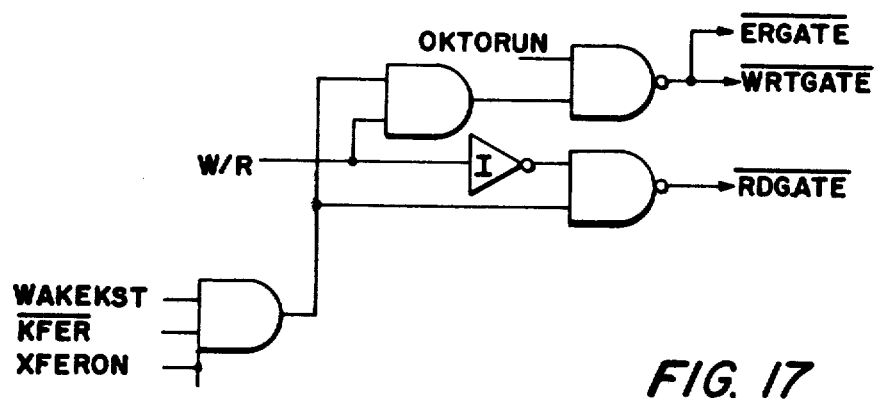

FIG. 16 shows the implementation of various signals used by the disk drive controller 18(1) and FIG. 16 shows the generation of additional control signals used by the controller 18(1).

The logic comprising the disk drive controller 18(1) communicates with the CPU 10 in four ways: first, by task request wakeup signals for the sector and word tasks i.e. $\overline{\text{KSEC}}$ and $\overline{\text{KWD}}$); second, by five task-specific F2 functions which modify the next microinstruction address; third, by seven task-specific F1 functions, four of which activate bus destination registers, and the remaining three of which provide useful pulses;

and fourth, by two bus sources. The following tables describe the effects of these.

| F1 Value | Name | Effect |
|---|---|---|
| 17 | KDATA ← | The KDATA register is loaded from BUS (0-15). This register is the data output register to the disk, and is also used to hold the disk address during KADR ← and seek commands. When used as a disk address it has the format of word A. |
| 16 | KADR ← | This causes the KADR ← register to be loaded from BUS(8-14). This register has the format of word C. In addition, it causes the head address bit to be loaded from KDATA ← (13). |
| 15 | KCOM ← | This causes the KCOM ← register to be loaded from BUS(1-5). The KCOM ← register has the following interpretation:<br>(1) XFEROFF = 1 inhibits data transmission to/from<br>(2) WDINHIB = prevents the disk word task from awakening.<br>(3) BCLKSRC = 1 means take bit clock from disk input or crystal clock, as appropriatte. =0 forces use of crystal clock.<br>(4) WFFO = 0 holds the disk bit counter at −1 until a 1-bit is read. =1 allows the bit counter to proceed normally.<br>(5) SENDADR = 1 causes KDATA ← (4-12) and KDATA ← (15) to be transmitted to disk unit as seek address. =0 inhibits such transmission. |
| 14 | CLRSTAT | Causes all error latches in disk controller hardware to reset |
| 13 | INCRECNO | Advances the shift registers holding the KADR register so that they present the number and read/write/check status of the next block (header, label, data) to the hardware. |
| 12 | KSTAT | KSTAT (12-15) are loaded from BUS (12-15). (Actually, BUS (13) is 'OR'ed into KSTAT(13).) This enables the microcode to enter conditions it detects into the status register. |
| 11 | STROBE | Initiates a disk seek operation. The KDATA ← register must have been loaded previously, and the SENDADR bit of the KCOMM ← register previously set to 1. |

| F2 Value | Name | Effect |
|---|---|---|
| 10 | INIT | NEXT ← NEXT OR (IF WDTASKACT AND WDINIT) THEN 37 ELSE 0) |
| 11 | RWC | NEXT ← NEXT OR (IF current record to be written THEN 3 ELSE IF current record to be checked THEN 2 ELSE 0) |
| 12 | RECNO | NEXT ← NEXT OR MAP (current record number) where<br>MAP(0) ← 0<br>MAP(1) ← 2<br>MAP(2) ← 3<br>MAP(3) ← 1 |
| 13 | XFRDAT | NEXT ← NEXT OR (IF current command wants data transfer THEN 1 ELSE 0) |
| 14 | SWRNRDY | NEXT ← NEXT OR (IF disk not ready to accept command THEN 1 ELSE 0) |
| 15 | NFER | NEXT ← NEXT OR (IF fatal error in latches THEN 0 ELSE 1) |

| | | |
|---|---|---|
| 16 | STROBON | NEXT ← NEXT OR (IF seek strobe still on THEN 1 ELSE 0). |

A memory reference to the main memory 16 is initiated by executing F1=6, MAR ←. Referring again to FIG. 4, the main memory store 17 is connected to the bus 22 by a memory data bus 21 through a conventional driver and parity device 19. The device 19 provides for the transfer of data to and from the main memory store 17 with a parity check upon the fetching fo data from the store 17.

The microcode referred to herein as dictating the enabling of various signals and processing is disclosed and flowcharted in Appendix A, attached to the instant application file but not printed herewith. The microassembler MU for the processor in this preferred embodiment is implemented in BCPL and is also described in Appendix A.

Although the invention has been described with respect to a presently preferred embodiment, it will be appreciated by those skilled in the art that various substitutions, modifications, etc. may be made without departing from the spirit and scope of the invention as defined by the following claims.

What is claimed is:

1. A data processing system comprising:
   a peripheral storage device having at least one recording medium and means for writing data onto and reading data from said recording medium;
   a controller coupled to said peripheral storage device and responsive to predetermined instructions and command data for controlling the writing of data onto and reading of data from said recording medium;
   a main memory storage device coupled to said controller and having a plurality of addressable storage locations, at least some of said storage locations capable of storing data to be written onto or that has been read from said recording medium, and at least some other of said storage locations capable of storing said command data, said command data including a portion thereof defining a verification word; and
   a central processing unit coupled to said controller and to said main memory storage device and including (a) means for supplying said predetermined instructions to said controller, (b) means for addressing the storage locations of said main memory storage device, (c) means for examining said portion of command data accessed from said main memory storage device in order to verify the validity of said accessed command data, said means for examining comprising constant memory means having a predetermined verification word stored therein and means for comparing said portion of said accessed command data with said predetermined verification word, said accessed command data being verified as valid only when the verification word in said first portion thereof matches said predetermined verification word, and (d) means for supplying to said controller command data verified as valid.

2. The data processing system of claim 1, wherein said means for comparing includes an arithmetic logic unit adapted to receive said portion of said command data as a first signal and said predetermined verification word from said constant memory means as a second signal, and means for controlling said arithmetic logic unit to perform an Exclusive-OR operation upon said first and second signals whereby said command data is verified as valid if a resultant third signal has the value of zero.

3. The data processing system of claim 1, wherein said peripheral storage device is a disk drive and said controller is a disk drive controller.

4. The data processing system of claim 1, wherein said command data is stored in said main memory storage device as a chain of command data blocks, each block containing a word pointing to the next block in the chain.

5. The data processing system of claim 4, wherein each command data block includes a command word, said portion of said command data being included as part of the command word of each command data block.

6. The data processing system of claim 5, wherein each command word is 16-bits in length and said portion of said command data includes the high order 8-bits of each 16-bit command word.

7. The data processing system of claim 6, wherein said peripheral storage device is a disk drive and said controller is a disk drive controller.

8. The data processing system of claim 7, wherein each command data block contains a word pointing to a section of the main memory storage device containing data to be written onto said recording medium or into which data read from said recording medium is to stored.

9. The data processing system of claim 7, wherein each command data block contains a disk address word.

10. The data processing system of claim 7, wherein each command data block contains a disk status word.

* * * * *